(12) United States Patent
Hirano

(10) Patent No.: US 8,610,957 B2
(45) Date of Patent: Dec. 17, 2013

(54) IMAGE PROCESSING APPARATUS, IMAGE PROCESSING METHOD, AND NON-TRANSITORY COMPUTER-READABLE MEDIUM

(75) Inventor: Masanori Hirano, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 192 days.

(21) Appl. No.: 13/304,755

(22) Filed: Nov. 28, 2011

(65) Prior Publication Data

US 2012/0133992 A1 May 31, 2012

(30) Foreign Application Priority Data

Nov. 29, 2010 (JP) ................................. 2010-265469

(51) Int. Cl.
*H04N 1/405* (2006.01)

(52) U.S. Cl.
USPC ........... 358/3.06; 358/1.9; 358/529; 358/534; 358/536

(58) Field of Classification Search
None
See application file for complete search history.

(56) References Cited

U.S. PATENT DOCUMENTS

| | | | | |
|---|---|---|---|---|
| 5,774,238 | A * | 6/1998 | Tsukada | 358/529 |
| 6,061,501 | A * | 5/2000 | Decker et al. | 358/1.9 |
| 7,360,869 | B2 * | 4/2008 | Kato et al. | 347/43 |
| 7,499,198 | B2 | 3/2009 | Hirano | |
| 7,564,604 | B2 * | 7/2009 | Shirasawa | 358/529 |
| 7,596,262 | B2 * | 9/2009 | Kobayashi | 382/162 |
| 7,600,842 | B2 | 10/2009 | Hirano et al. | |
| 7,952,763 | B2 * | 5/2011 | Borg | 358/1.9 |
| 8,203,754 | B2 * | 6/2012 | Yoshida | 358/1.9 |
| 8,330,970 | B2 * | 12/2012 | Matsushima | 358/1.13 |
| 2005/0200900 | A1 | 9/2005 | Hirano | |
| 2006/0181562 | A1 | 8/2006 | Hirano et al. | |
| 2008/0278764 | A1 | 11/2008 | Hirano et al. | |
| 2011/0141528 | A1 | 6/2011 | Hirano et al. | |

FOREIGN PATENT DOCUMENTS

| | | |
|---|---|---|
| JP | 5-045988 A | 2/1993 |
| JP | 2007-050708 A | 3/2007 |
| JP | 2010-064467 A | 3/2010 |
| JP | 2010-074325 A | 4/2010 |
| JP | 2010-089487 A | 4/2010 |
| JP | 4664809 B2 | 4/2011 |

OTHER PUBLICATIONS

English language abstract for patent publication No. JP-2006-279922 (which corresponds to JP-4664809-B2).

* cited by examiner

*Primary Examiner* — Dung Tran
(74) *Attorney, Agent, or Firm* — Harness, Dickey & Pierce, P.L.C.

(57) ABSTRACT

An image processing apparatus includes: a first colorant reducing unit that performs a first colorant reducing process that reduces colorant of black on second image data to output fourth image data representing tone values of the black separation on a per-pixel basis; a second colorant reducing unit that performs a second colorant reducing process that reduces the colorants of the colors other than black on a portion of third image data, the portion corresponding to the separations of the colors other than black, to output fifth image data representing tone values of each of the separations of the colors other than black on a per-pixel basis; and a combining unit that combines the fourth image data and the fifth image data to output sixth image data representing tone values of each of the separations of the colors including black on a per-pixel basis.

15 Claims, 20 Drawing Sheets

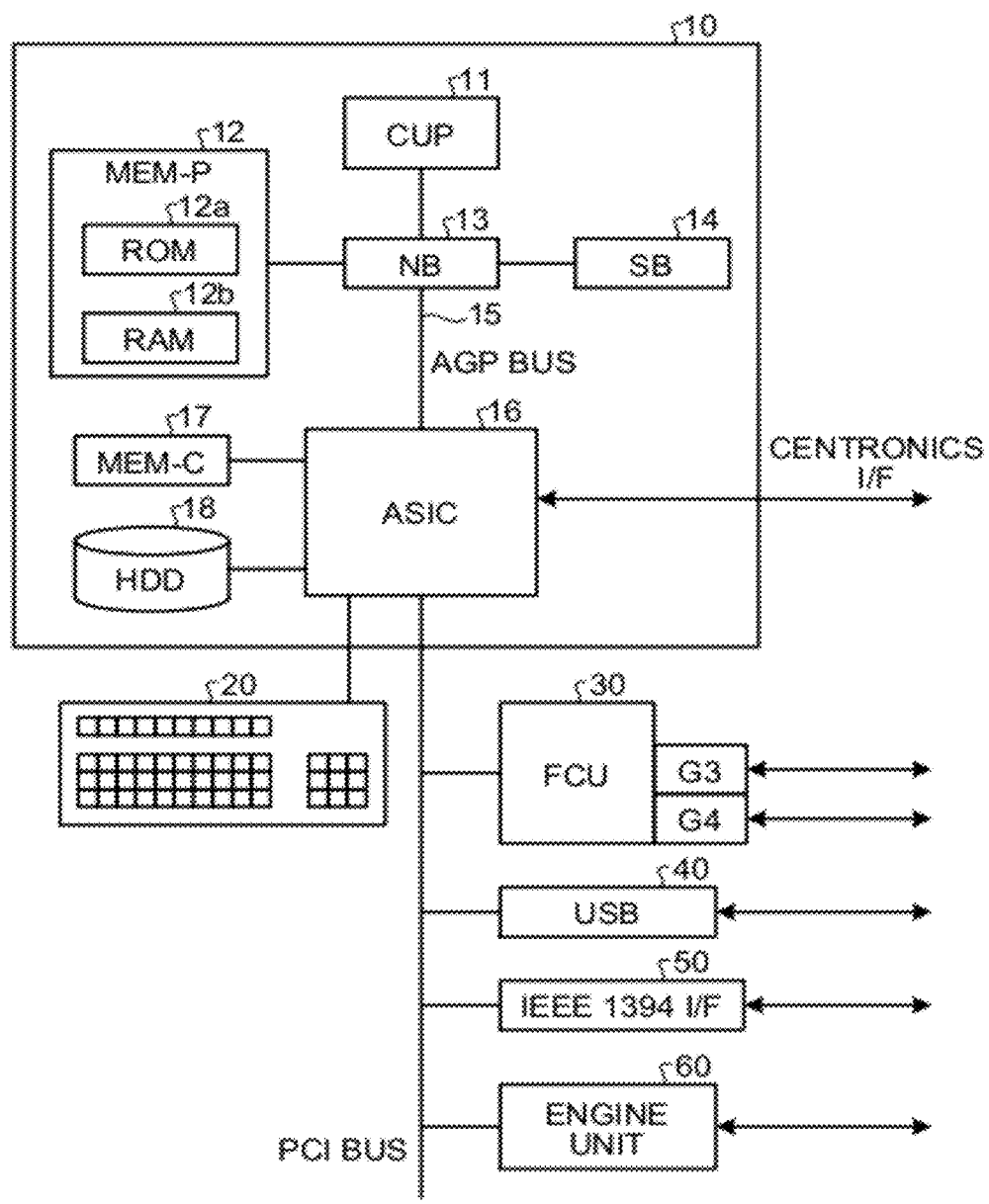

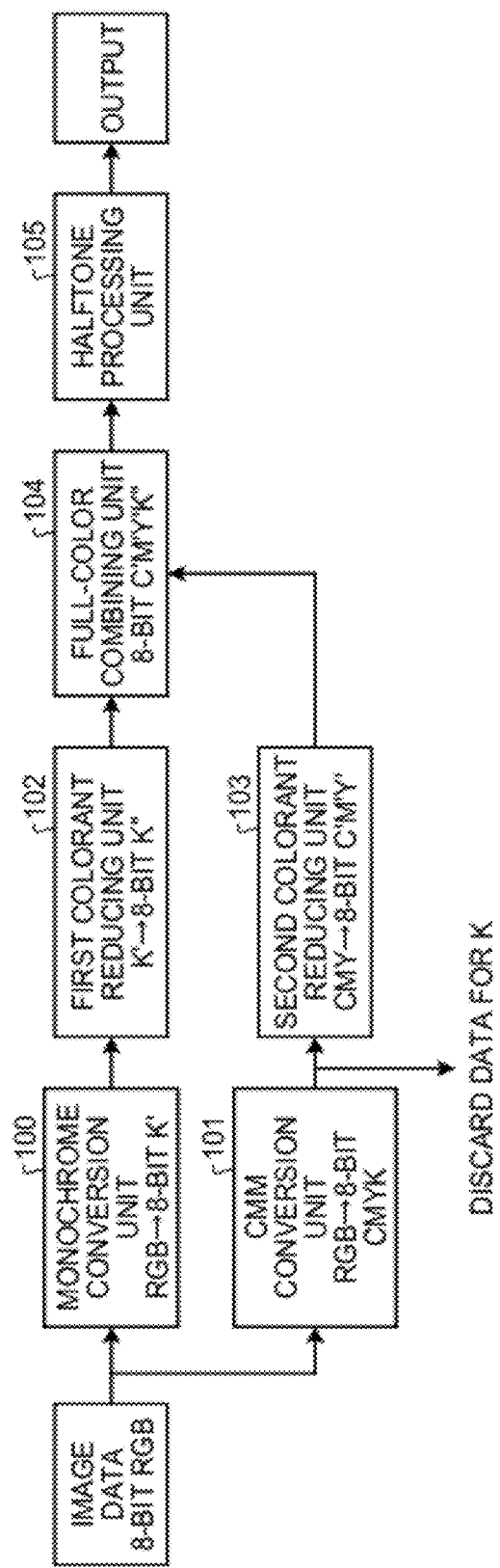

NOT CORRECTED

OUTPUT TONE VALUE= 0.5×(INPUT TONE VALUE)

OUTPUT TONE VALUE= 0.25×(INPUT TONE VALUE)

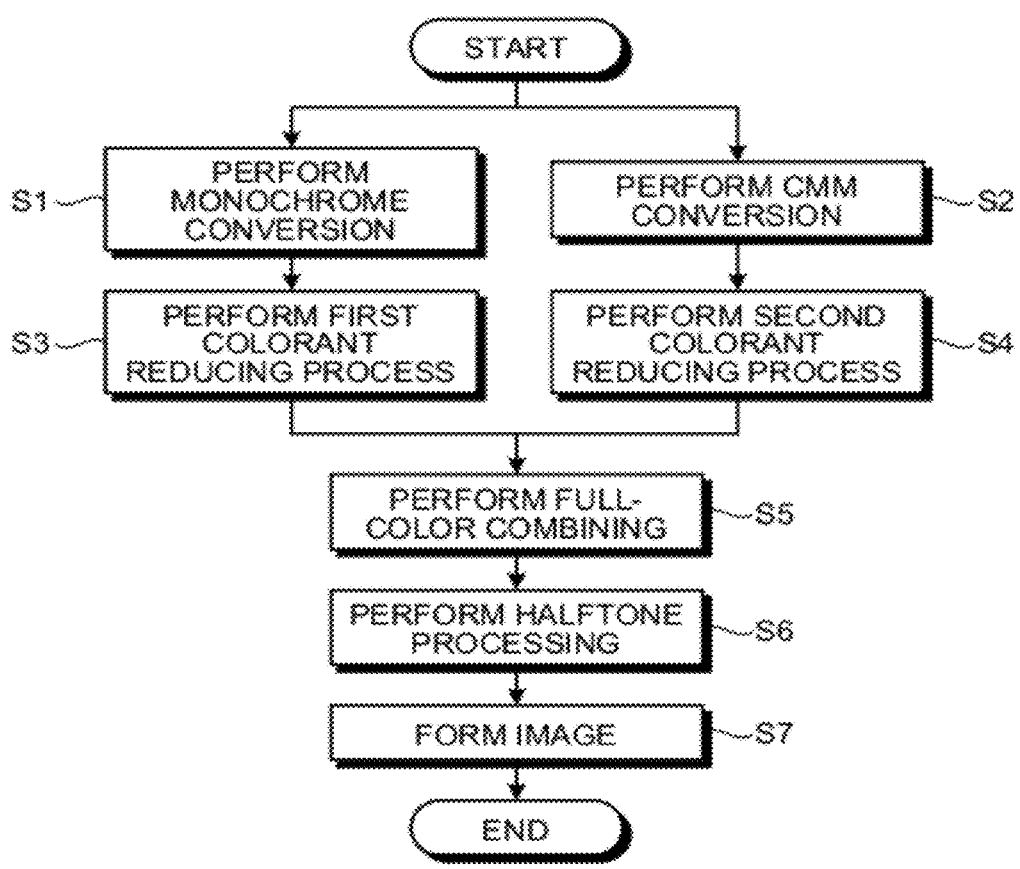

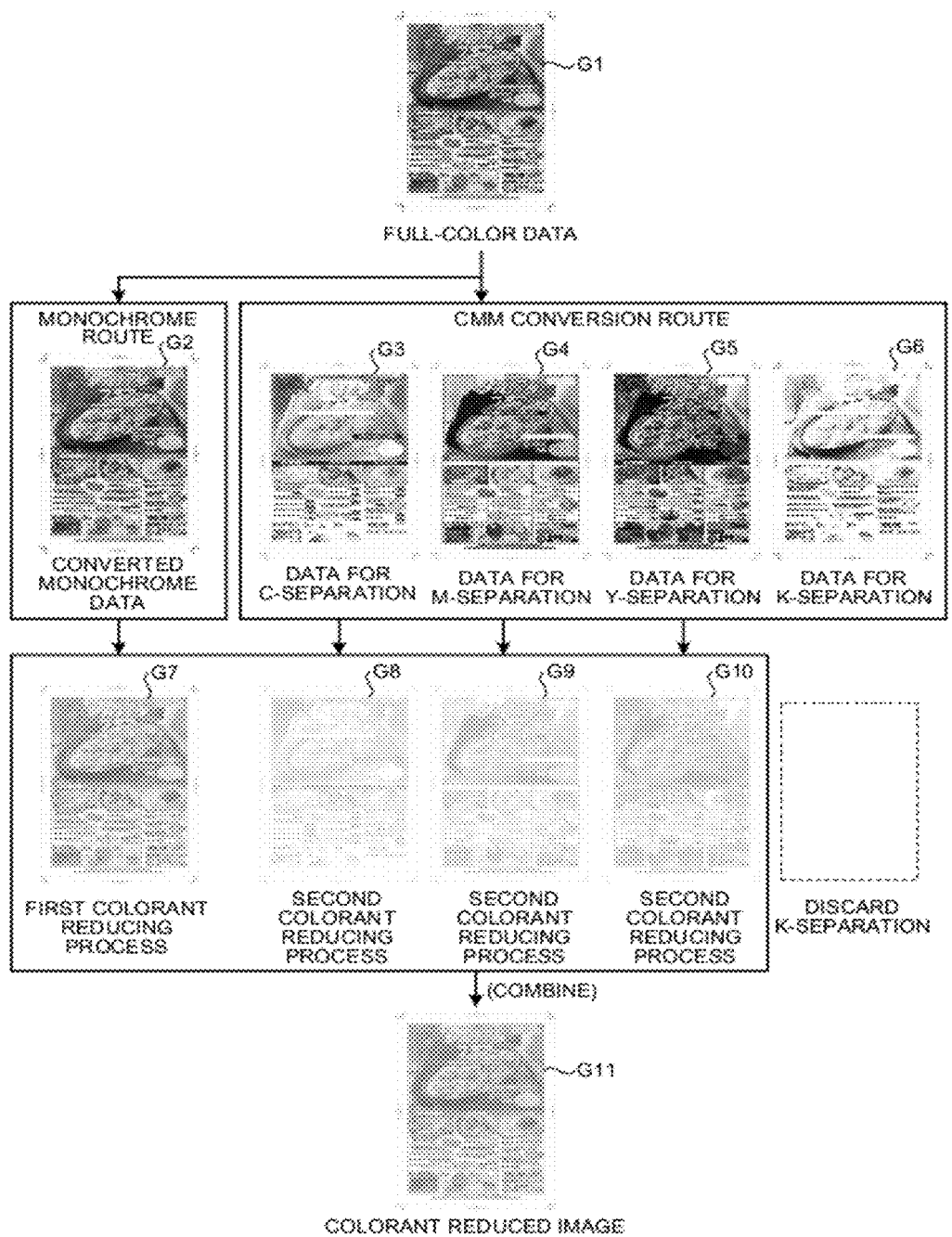

NO DOT THINNING

50% DOT THINNING

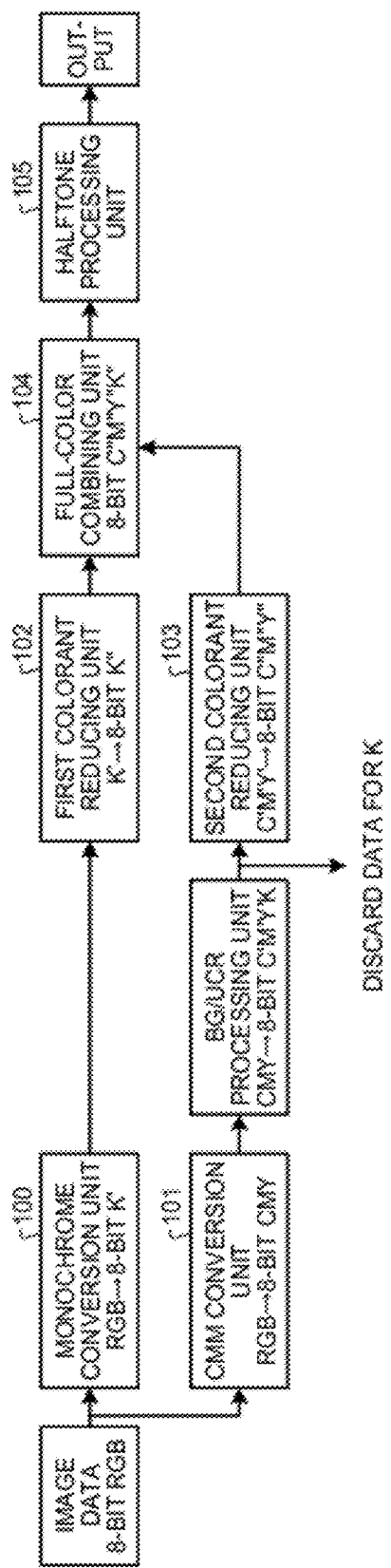

IMAGE INCLUDING COLOR IMAGE REGION TO BE LOST BY COLORANT REDUCING PROCESS

IMAGE NOT INCLUDING COLOR IMAGE REGION TO BE LOST BY COLORANT REDUCING PROCESS

DOT SIZE REDUCTION

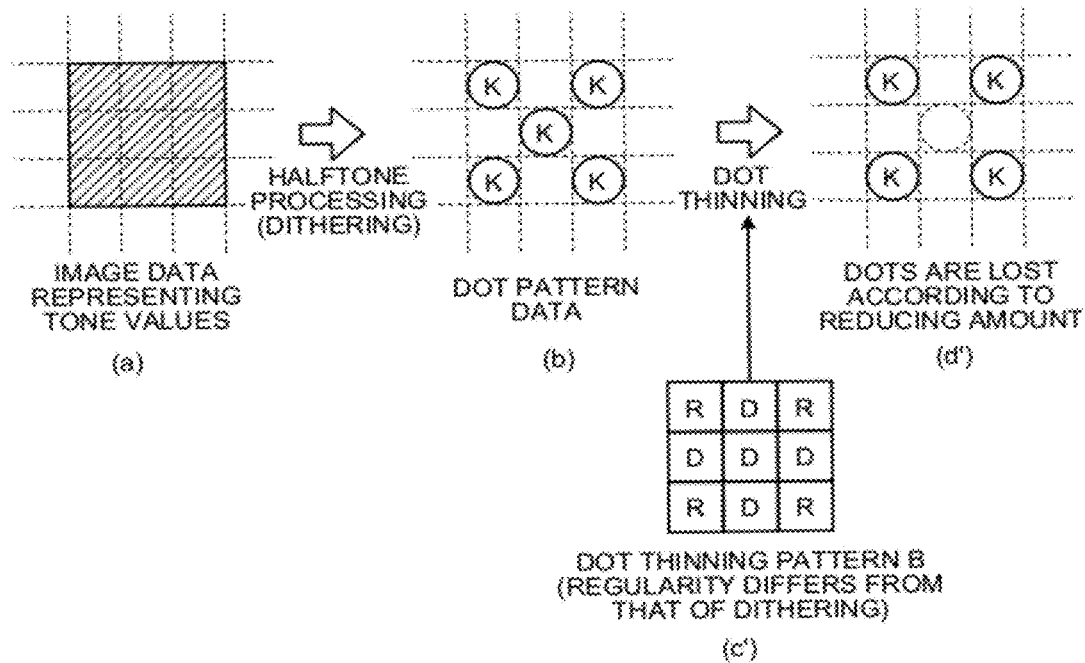

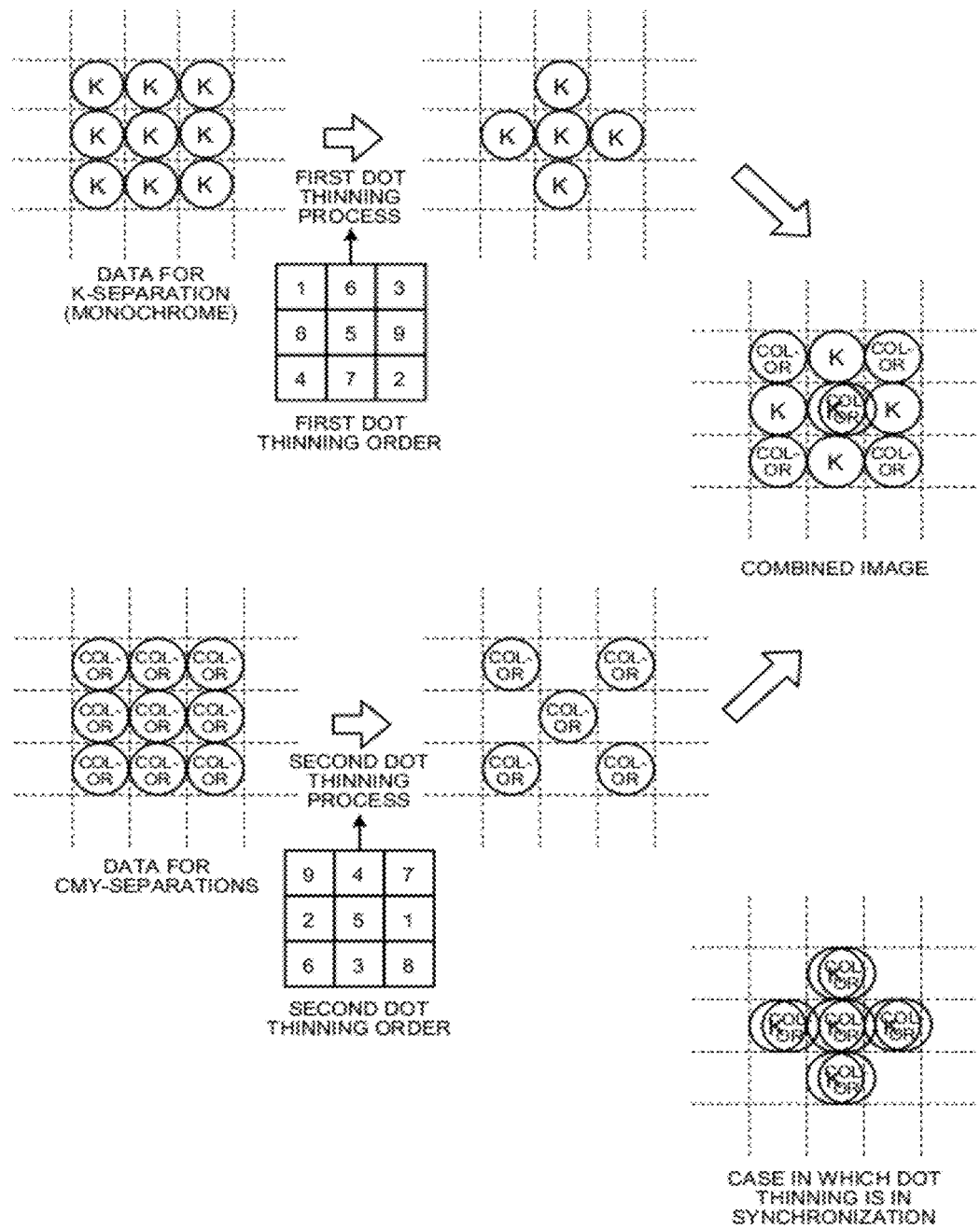

IMAGE PROCESSING APPARATUS, IMAGE PROCESSING METHOD, AND NON-TRANSITORY COMPUTER-READABLE MEDIUM

CROSS-REFERENCE TO RELATED APPLICATIONS

The present application claims priority to and incorporates by reference the entire contents of Japanese Patent Application No. 2010-265469 filed in Japan on Nov. 29, 2010.

BACKGROUND OF THE INVENTION

1. Field of the Invention

The present invention relates to image processing apparatuses, image processing methods, and non-transitory computer-readable medium.

2. Description of the Related Art

From the viewpoints of economic conditions of recent years and environmental protection, reduction in running cost even of image forming apparatuses for business or personal use has become a focus of attention. For such image forming apparatuses, various types of processing methods have been proposed as a mode for reducing amounts of colorants to be consumed (hereinafter, "colorant usage") to form (print) an image (see, for example, Japanese Publication No. 2007-50708). There are different types of colorant depending on a type of an image forming apparatus that uses the colorant. The colorant corresponds to toner for electrophotographic recording apparatuses, while the colorant corresponds to ink for inkjet recording apparatuses, stencil printing apparatuses, offset printing apparatuses, and the like. The colorant corresponds to ink ribbons for thermal transfer recording apparatuses. The colorant-usage reducing mode aims at reducing running cost for forming a sheet of an image by reducing amounts of the colorants to be consumed than those of a standard image forming mode in the image forming apparatus. Various methods for forming an image in a colorant-usage reducing mode have conventionally been put forth. Examples of such a method include a first method that multiplies a tone value of each of pixels that form an image represented by image data by a coefficient that is equal to or greater than zero and less than or equal to one for each of cyan (C) colorant, magenta (M) colorant, yellow (Y) colorant, and black (K) colorant to thereby decrease a density of the entire image. The higher the density of an image, the larger amounts of the colorants are required. Accordingly, this method reduces colorant usage by decreasing the density of the entire image. As a second method, a method of reducing colorant usage by applying a mask to an image that is to be output from an image forming apparatus to thereby thin dots that form the image can be employed. A method of gradually reducing dot size is applicable, as a modification of the dot thinning, to an image forming apparatus capable of forming multi-level dots.

As a matter of course, the colorant-usage reducing mode puts a highest premium on reduction of colorant usage and gives secondary concern to image quality. However, unlike former times, occasions of printing colorful, more appealing images containing not only simple graphs but also a number of illustrations and/or pictures taken with a digital camera have increased recently. Printing such an image involves a problem that an image formed in the colorant-usage reducing mode is inferior in image quality to an image formed in a standard image forming mode. This is a problem concomitant to the colorant-usage reducing mode. To make this image degradation obtrusive as little as possible, as a third method, a method of reducing colorant usage by actively performing undercolor removal (UCR) in a black generation (BG)/UCR process so as to maximize a portion of image, in which multiple colors are overlaid on one another, replaced with image data for K-separation has been provided in recent years.

As a fourth method based on a diametrically opposed concept that a minimum requirement for an image is that what is drawn on the image is distinguishable, a method of removing all portions but leaving only outline portions of the image can be employed. This method reduces colorant usage by an amount corresponding to portions inside the outline portions. As a matter of course, an image formed by using this method greatly differs from an image represented by original image data; however, this method makes significant reduction in colorant usage possible. As a fifth method, a method of protecting an object that is preferably not to degrade in image quality by making it possible to select whether to perform image forming in the colorant-usage reducing mode on a per-image-object (a character object, a line drawing object, a graphics object, a picture object, or the like) basis can be employed.

Although the third method or the fifth method allows forming an image in image quality higher than that of the first method and the second method, when an attempt of further reducing colorant usage is made, image quality of an image formed by using the third method degrades to an appreciable level. More specifically, what is drawn in the image can be indistinguishable due to a decrease in image contrast. This tendency becomes more prominent in a picture object or the like object. The fourth method that causes outline portions to be left can be used without problem for a character object or a graphics object, of which shape itself is information. However, as for an object, such as a picture object, for which texture is an important factor, when an image is formed by using the fourth method, disparity in texture stands out, making it difficult to guess an original image.

It is possible to avoid decline in image quality by excluding an object, such as a picture object, with which a trouble is likely to occur, as in the fifth method or by setting a small colorant reducing amount, by which colorant usage is to be reduced, for such an object. However, as can be seen from proliferation of digital cameras and increase in printing of Web pages in recent years, occasions to print images containing a large number of pictures have sharply increased. This can unfavorably decrease effectiveness of the colorant usage reduction by such a method. Furthermore, to switch image processing on a per-object basis, a process of separating objects is required. When an operating system (OS) of a computer has a function of dividing image data into image data pieces each corresponding to an object and outputting the divided image data pieces, image processing can be performed individually on the per-object basis. However, in a situation where the OS does not have such a function, a situation where an image is obtained by scanning with a scanner, or a like situation, it is necessary to perform image-area separation and determine what object each image area is for each of the image areas. Such image-area separation places a very heavy computational load and can result in a decrease in throughput to output of a result of processing, or an increase in price of the apparatus resulting from mounting high-performance processing circuit on the image forming apparatus. Furthermore, even when image-area separation is performed, object(s) that exists in an image is not always recognized appropriately, and hence it is necessary to keep taking possibility of erroneous recognition into consideration. Accordingly, intended image quality is not always achieved.

Under such circumstances, forming a high-quality image with colorant usage reduced by a large amount but with restricted degradation in image quality has been desired.

SUMMARY OF THE INVENTION

It is an object of the present invention to at least partially solve the problems in the conventional technology.

According to an aspect of the present invention, there is provided an image processing method performed by an image processing apparatus that performs image processing to form an image on a printing medium by using colorants of a plurality of colors including black, the image processing method including: performing, by a first color conversion unit, first color conversion on first image data to output second image data, the first image data representing tone values of each of colors in a color system that differ from a color system of the plurality of colors for each of pixels that form the image, the second image data representing tone values of a black separation on a per-pixel basis; performing, by a second color conversion unit, second color conversion on the first image data to output third image data representing tone values of each of separations of the colors including black on a per-pixel basis; performing, by a first colorant reducing unit, a first colorant reducing process that reduces amounts of colorant to be consumed of black on the second image data to output fourth image data representing tone values of the black separation on a per-pixel basis; performing, by a second colorant reducing unit, a second colorant reducing process that reduces amounts of the colorants to be consumed of the colors other than black on a portion of the third image data, the portion corresponding to the separations of the colors other than black, to output fifth image data representing tone values of each of the separations of the colors other than black on a per-pixel basis; and combining, by a combining unit, the fourth image data and the fifth image data to output sixth image data representing tone values of each of the separations of the colors including black on a per-pixel basis.

According to another aspect of the present invention, there is provided an image processing method performed by an image processing apparatus that performs image processing to form an image on a printing medium by using colorants of a plurality of colors including black, the image processing method including: performing, by a first color conversion unit, first color conversion on first image data to output second image data, the first image data representing tone values of each of colors in a color system that differ from a color system of the plurality of colors for each of pixels that form the image, the second image data representing tone values of a black separation on a per-pixel basis; performing, by a second color conversion unit, second color conversion on the first image data to output third image data representing tone values of each of separations corresponding to the colors including black on a per-pixel basis; combining, by a combining unit, the second image data and a portion of the third image data, the portion corresponding to the separations of the colors other than black, to output fourth image data representing tone values of each of the separations of the colors including black on a per-pixel basis; performing, by a halftone processing unit, halftone processing that generates dot pattern data representing a dot pattern, in which dots are arranged, for each of the separations of the colors including black by using the fourth image data output at the combining; performing, by a first colorant reducing unit, a first colorant reducing process that reduces amounts of colorant to be consumed of black on a portion of the dot pattern data generated at the halftone processing, the portion corresponding to the black separation, to output first dot pattern data for the black separation; and performing, by a second colorant reducing unit, a second colorant reducing process that reduces amounts of the colorants to be consumed of the colors other than black on a portion of the dot pattern data, the portion corresponding to the separations of the colors other than black, to output second dot pattern data for each of the separations of the colors other than black.

According to still another aspect of the present invention, there is provided an image processing apparatus that performs image processing to form an image on a printing medium by using colorants of a plurality of colors including black, the image processing apparatus including: a first color conversion unit that performs first color conversion on first image data to output second image data, the first image data representing tone values of each of colors in a color system that differ from a color system of the plurality of colors for each of pixels that form the image, the second image data representing tone values of a black separation on a per-pixel basis; a second color conversion unit that performs second color conversion on the first image data to output third image data representing tone values of each of the separations corresponding to the colors including black on a per-pixel basis; a first colorant reducing unit that performs a first colorant reducing process that reduces amounts of colorant to be consumed of black on the second image data to output fourth image data representing tone values of the black separation on a per-pixel basis; a second colorant reducing unit that performs a second colorant reducing process that reduces amounts of the colorants to be consumed of the colors other than black on a portion of the third image data, the portion corresponding to the separations of the colors other than black, to output fifth image data representing tone values of each of the separations of the colors other than black on a per-pixel basis; and a combining unit that combines the fourth image data and the fifth image data to output sixth image data representing tone values of each of the separations of the colors including black on a per-pixel basis.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a diagram illustrating a hardware configuration of an image processing apparatus according to a first embodiment of the present invention;

FIG. 2 is a diagram illustrating a functional configuration of an image processing section of the image processing apparatus;

FIG. 4 is a flowchart of a procedure for an image forming process to be performed by the image processing apparatus;

FIG. 5 is a diagram illustrating images that can be obtained at steps in the image forming process of FIG. 4;

FIG. 19 is a diagram illustrating a functional configuration of an image processing section of an image processing apparatus according to still another modification;

FIG. 23 is a diagram illustrating a situation where a rule for arranging dots into a dot pattern where the dots are arranged in halftone processing is not the same as a rule for thinning the dots arranged in the dot pattern in the colorant reducing process, in which (a) being a diagram illustrating image data representing tone values, (b) being a diagram illustrating the dot pattern into which the dots are arranged in the halftone processing, (c') being a diagram visualizing the rule for thinning the dots arranged in the dot pattern, and (d') being a diagram illustrating a state where dots are discarded from the dot pattern in the colorant reducing process; and FIG. 24 is a diagram depicting an example where interference occurs between a dot pattern, in which dots that are not discarded by dot thinning in a colorant conversion process on a monochrome conversion route are arranged, and a dot pattern, in which dots that are not discarded by dot thinning in a colorant conversion process on a full-color conversion route are arranged.

DETAILED DESCRIPTION OF THE PREFERRED EMBODIMENTS

Figure 3A:
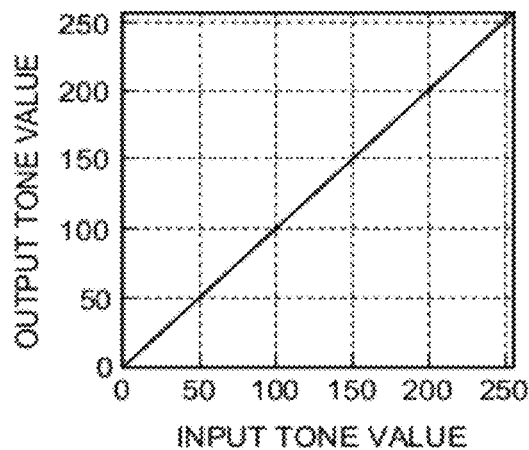
FIGS. 3A to 3C are diagrams for explaining coefficients by which tone values are to be multiplied, FIG. 3A illustrating a case where tone values are not multiplied by a coefficient, FIG. 3B illustrating a case where tone values are multiplied by 0.5, FIG. 3C illustrating a case where tone values are multiplied by 0.25.

Exemplary embodiments of the present invention will be described in detail below with reference to the accompanying drawings.

First Embodiment

FIG. 1 is a diagram illustrating a hardware configuration of an image processing apparatus according to a first embodiment of the present invention. The image processing apparatus according to the first embodiment includes cyan (C) colorant, magenta (M) colorant, yellow (Y) colorant, and black (K) colorant, and a paper cassette, in which a printing medium is to be stored. The image processing apparatus performs printing by forming an image on the printing medium fed from the paper cassette with the colorants of the colors. As illustrated in FIG. 1, the image processing apparatus includes a controller 10 and an engine unit 60 that are connected to each other over a peripheral component interconnect (PCI) bus. The controller 10 is a controller that controls the overall image processing apparatus, rendering, communication, and inputs entered from an operating unit (not shown). The engine unit 60 is a printer engine connectable to the PCI bus. Examples of the engine unit 60 include a four-drum color plotter that includes a drum for forming a C-separation image with the C colorant, a drum for forming an M-separation image with the M colorant, a drum for forming a Y-separation image with the Y colorant, and a drum for forming a K-separation image with the K colorant. Note that the engine unit 60 includes, in addition to an engine section serving as what is called a plotter, an image processing section for error diffusion, gamma conversion, and the like. The configuration of the engine unit 60 including such a four-drum color plotter is known, and detailed descriptions thereabout are omitted.

The controller 10 includes a central processing unit (CPU) 11, a north bridge (NB) 13, system memory (MEM-P) 12, a south bridge (SB) 14, local memory (MEM-C) 17, an application specific integrated circuit (ASIC) 16, and a hard disk drive (HDD) 18, where an accelerated graphics port (AGP) bus 15 connects between the NB 13 and the ASIC 16. The MEM-P 12 further includes read only memory (ROM) 12a and random access memory (RAM) 12b. The ROM 12a is read only memory for use as memory for storing program instructions and data. Various types of program instructions and various types of data pieces are to be stored in the ROM 12a. The RAM 12b is writable and readable memory for use in storing program instructions and data, rendering by a printer, and/or the like. Various types of program instructions and/or various types of data pieces are to be stored in the RAM 12b.

The CPU 11 that controls the overall image processing apparatus includes a chip set that includes the NB 13, the MEM-P 12, and the SB 14. The CPU 11 is connected to another device via the chip set. The CPU 11 executes various program instructions stored in the MEM-P 12 or the HDD 18, thereby causing the information processing apparatus to implement various functions.

The NB 13 is a bridge for connecting the CPU 11 to the MEM-P 12, the SB 14, and the AGP 15. The NB 13 includes a memory controller, a PCI master, and an AGP target. The memory controller controls reading and writing from and to the MEM-P 12.

The SB 14 is a bridge for connecting the NB 13 to a PCI device and peripheral devices. The SB 14 is connected to the NB 13 via the PCI bus, to which a network interface (I/F) unit and the like are also to be connected.

The ASIC 16 is an integrated circuit (IC) for use in image processing. The ASIC 16 includes a hardware component for image processing and functions as a bridge that connects the AGP 15, the PCI bus, the HDD 18, and the MEM-C 17 to one another. The ASIC 16 includes a PCI target and an AGP master, an arbiter (ARB) which is a core of the ASIC 16, a memory controller that controls the MEM-C 17, a plurality of direct memory access controllers (DMACs) that rotate image data by a hardware logic or the like, and a PCI unit that transfers data between the engine unit 60 and the ASIC 16 via the PCI bus. A fax control unit (FCU) 30, a universal serial bus (USB) 40, an Institute of Electrical and Electronics Engineers 1394 (IEEE 1394) I/F 50 are connected to the ASIC 16 via the PCI bus. An operation input unit 20 is also connected to the ASIC 16. The operation input unit 20 includes a keyboard and/or an operation button for receiving an operation input entered by a user.

The MEM-C 17 is local memory for use as a copy image buffer and a code buffer. The HDD 18 is storage for accumulating image data, program instructions, font data, and forms. The HDD 18 stores, for example, a lookup table (LUT), which will be described later.

The AGP bus 15 is a bus interface for a graphics accelerator card introduced to speed up graphics operations and allows direct access to the MEM-P 12 with a high throughput, thereby speeding up operations related to the graphic accelerator card.

The functional configuration of the image processing section of the image processing apparatus having such a hardware configuration as described above will be described with reference to FIG. 2. The image processing apparatus includes a monochrome conversion unit 100, a color management module (CMM) conversion unit 101, a first colorant reducing unit 102, a second colorant reducing unit 103, a full-color combining unit 104, and a halftone processing unit 105. A function of each of these units is implemented by any one of execution of the various types of program instructions stored in the MEM-P 12 or the HDD 18 by the CPU 11 and the image processing section in the ASIC 16 and the engine unit 60. The functions to be implemented by the units when a colorant reducing mode that reduces colorant usage is set in the image processing apparatus will be individually described below. The colorant reducing mode can be set in response to, for instance, an operation input entered by a user by using the operation input unit 20.

Meanwhile, image data to be used by the image processing apparatus to form an image is obtained based on print instruction data that is received together with a printing condition from, for example, a personal computer (PC) via a network I/F unit connected to the PCI bus that is connected to the SB 14. The print instruction data instructs that the image should be printed. The print instruction data is described in, for instance, a page description language (PDL) format. The image processing apparatus obtains target image data representing an image to be formed by interpreting the print instruction data. The image data represents, on a per-pixel basis, 8-bit tone values of each of RGB-separations. The image data is input to each of the monochrome conversion unit 100 and the CMM conversion unit 101. On each of a monochrome conversion route and a full-color conversion route, the colorant reducing process is performed by performing color conversion from RGB space to CMYK space. The monochrome conversion unit 100 performs color conversion via the monochrome conversion route. The first colorant reducing unit 102 performs the colorant reducing process via the monochrome conversion route. The CMM conversion unit 101 performs color conversion on the full-color conversion route. The second colorant reducing unit 103 performs the colorant reducing process on the full-color conversion route. Details of these will be described below.

The monochrome conversion unit 100 performs the monochrome conversion by converting image data representing 8-bit tone values of each of RGB-separations into gray-scale image data to thereby output image data representing 8-bit tone values of K-separation. Examples of a method for the monochrome conversion include a National Television System Committee (NTSC) conversion method. According to this method, a tone value (K) of K-separation can be calculated by assigning a toner value (R) of R-separation, a tone value (G) of G-separation, and a tone value (B) of B-separation to variables of Equation (1) below:

$$K=(R\times 306+G\times 601+B\times 117)/1024 \qquad (1)$$

Figure 3B:
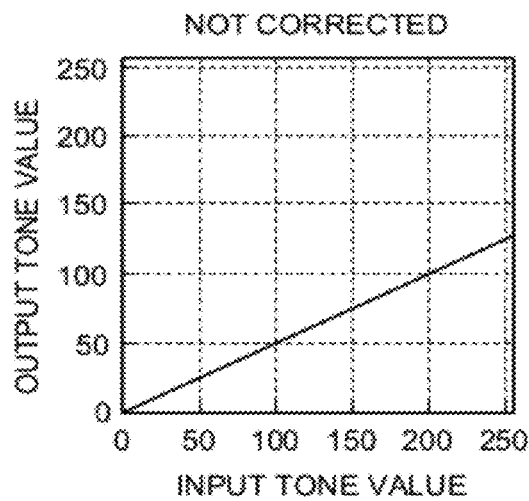
Figure 3C:
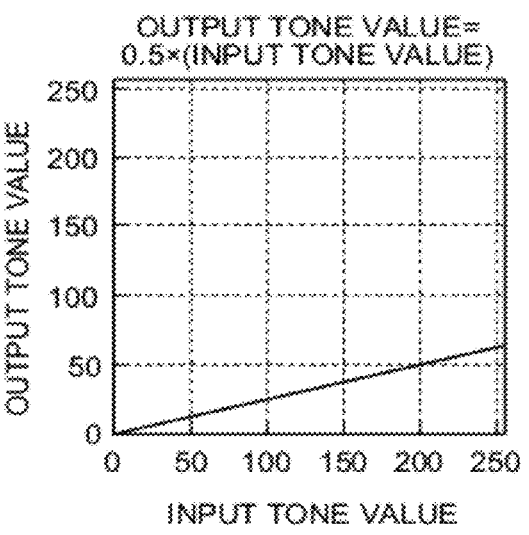

The first colorant reducing unit 102 performs the colorant reducing process on the image data output from the monochrome conversion unit 100. More specifically, for instance, the first colorant reducing unit 102 multiplies each tone value represented by the image data by a coefficient that is equal to or greater than zero and less than or equal to one to thereby output image data representing tone values multiplied by the coefficient. For example, in contrast to a case illustrated in FIG. 3A where each tone value is not multiplied by a coefficient, each tone value may be multiplied by 0.5 as illustrated in FIG. 3B; alternatively, each tone value may be multiplied by 0.25 as illustrated in FIG. 3C.

Referring back to FIG. 2, the full-color conversion route will be described below. The CMM conversion unit 101 performs CMM conversion on the image data representing 8-bit tone values of each of RGB-separations. More specifically, for instance, the CMM conversion unit 101 converts tone values of RGB-separations represented by the image data into tone values of CMYK-separations by using the LUT indicating relationship between each tone value of each of RGB-separations and each tone value of each of CMKY-separations to thereby output image data representing 8-bit tone values of each of CMYK-separations. This LUT is stored in, e.g., the HDD 18 in advance.

The second colorant reducing unit 103 performs the colorant reducing process on image data for each of CMY-separations, which is a portion of the image data output from the CMM conversion unit 101 exclusive of image data for K-separation. More specifically, for instance, as with the first colorant reducing unit 102, the second colorant reducing unit 103 multiplies, for each of CMY-separations, each tone value represented by the image data by a coefficient that is equal to or greater than zero and less than or equal to one to thereby output image data representing tone values multiplied by the coefficient as illustrated in FIGS. 3B and 3C.

Note that the coefficient, by which each tone value is to be multiplied by the second colorant reducing unit 103, is preferably smaller than or equal to the coefficient, by which each tone value is to be multiplied by the first colorant reducing unit 102. It is more preferable that the former coefficient is smaller than the latter coefficient. This is for enhancement of contrast of an image to be formed. More specifically, amounts of the colorants to be consumed to form an image based on image data output via the monochrome conversion route affects reproducibility of contrast of the image to be formed. Accordingly, excessive reduction can make the image itself unsharp and result in significant degradation of the image. In contrast, an image formed based on image data output via the full-color conversion route is enhanced by an image of K-separation, which serves as a background, formed based on the image data output via the monochrome conversion route. Accordingly, even when the amounts of the colorants to be consumed to form the image based on the image data output via the full-color conversion route is reduced by a large amount, complete loss of information that should be provided by the image itself will not occur. This makes it possible to provide a high-quality image even when colorant usage in each of CMY-separations is reduced by a large amount. Generally, colorant of K is least expensive among colorants; there is even a case where prices of colorants of colors other than K are as high as several times a price of colorant of K. Therefore, by reducing the amounts of the colorants to be consumed of the colors other than K by a large amount, effective reduction in running cost can be achieved.

The continuation of the description with reference to FIG. 2 will be given below. The full-color combining unit 104 combines the image data for K-separation output from the first colorant reducing unit 102 and the image data for each of CMY-separations output from the second colorant reducing unit 103 to thereby output 8-bit image data for each of CMYK-separations. The halftone processing unit 105 performs halftone processing, by dithering, that generates for each of CMYK-separations dot pattern data that represents a dot pattern, in which dots are arranged according to the tone values represented by the image data output from the full-color combining unit 104, and outputs the dot pattern data. The engine unit 60 performs printing by using the dot pattern data for each of CMYK-separations output from the halftone processing unit 105. More specifically, for each of CMYK-separations, an image of one of the CMYK-separations is formed by forming a dot pattern represented by the dot pattern data for the color separation on a corresponding drum with the corresponding colorant. These images are transferred onto a printing medium, such as paper, to form an image on the printing medium. Printing is performed by the image processing apparatus in this way.

The procedure for the image forming process to be performed by the image processing apparatus according to the first embodiment will be described with reference to FIG. 4. The image processing apparatus performs the monochrome conversion by using the function of the monochrome conversion unit 100 on target 8-bit-per-color-separation RGB image data, from which an image is to be formed, to thereby output 8-bit image data for K-separation (Step S1). The image processing apparatus also performs the CMM conversion by using the function of the CMM conversion unit 101 on the target 8-bit-per-color-separation RGB image data to thereby output image data representing 8-bit tone values of each of CMYK-separations (Step S2).

The image processing apparatus performs the colorant reducing process described above by using the function of the first colorant reducing unit 102 on the 8-bit image data for K-separation output at Step S1 to thereby output colorant-reduced 8-bit image data for K-separation (Step S3). The image processing apparatus also performs the colorant reducing process described above on image data for each of CMY-separations, which is a portion of the 8-bit image data for each of CMYK-separations output at Step S2 exclusive of image data for K-separation, by using the function of the second colorant reducing unit 103 to thereby output colorant-reduced 8-bit image data for each of CMY-separations (Step S4). The image processing apparatus combines the 8-bit image data for K-separation output at Step S3 and the 8-bit-image data for each of CMY-separations output at Step S4 by using the function of the full-color combining unit 104 to thereby output 8-bit image data for each of CMYK-separations (Step S5). The image processing apparatus performs dithering of the image data for each of CMYK-separations output at Step S5 by using the function of the halftone processing unit 105 to thereby generate dot pattern data for each of CMYK-separations, and outputs the dot pattern data (Step S6). The image processing apparatus performs printing by causing the engine unit 60 to form an image by using the dot pattern data for each of the CMYK-separations output at Step S6 and transfer the image onto a printing medium (Step S7).

FIG. 5 is a diagram illustrating images that can be obtained at Steps in the image forming process of FIG. 4. At Step S1, image data representing an image G2 is output as image data for K-separation obtained from image data representing an image G1. At Step S2, image data representing an image G3, image data representing an image G4, image data representing an image G5, and image data representing an image G6 are output as image data for C-separation, image data for M-separation, image data for Y-separation, and image data for K-separation, respectively, obtained from the image data representing the image G1. At Step S3, image data representing an image G7 is output as image data for K-separation obtained from the image data representing the image G2. At Step S4, image data representing an image G8 is output as image data for C-separation obtained from the image data representing the image G3; image data representing an image G9 is output as image data for M-separation obtained from the image data representing the image G4; image data representing an image G10 is output as image data for Y-separation obtained from the image data representing the image G5. At Step S4, no image data for K-separation is output. At Step S5, the image data representing the image G7, the image data representing the image G8, the image data representing the image G9, and the image data representing the image G10 are combined. At Step S9, dithering of the combined image data is performed. At Step S7, an image G11 is transferred onto a printing medium. Printing is performed in this way. As a result, contrast and texture are ensured with colorant usage reduced by a large amount. Accordingly, an image that has tints of colors perceivable for a user can be obtained. Thus, a risk that printing an image with reduced colorant usage results in complete loss of information that should be obtained from the image can be avoided.

Figure 6:
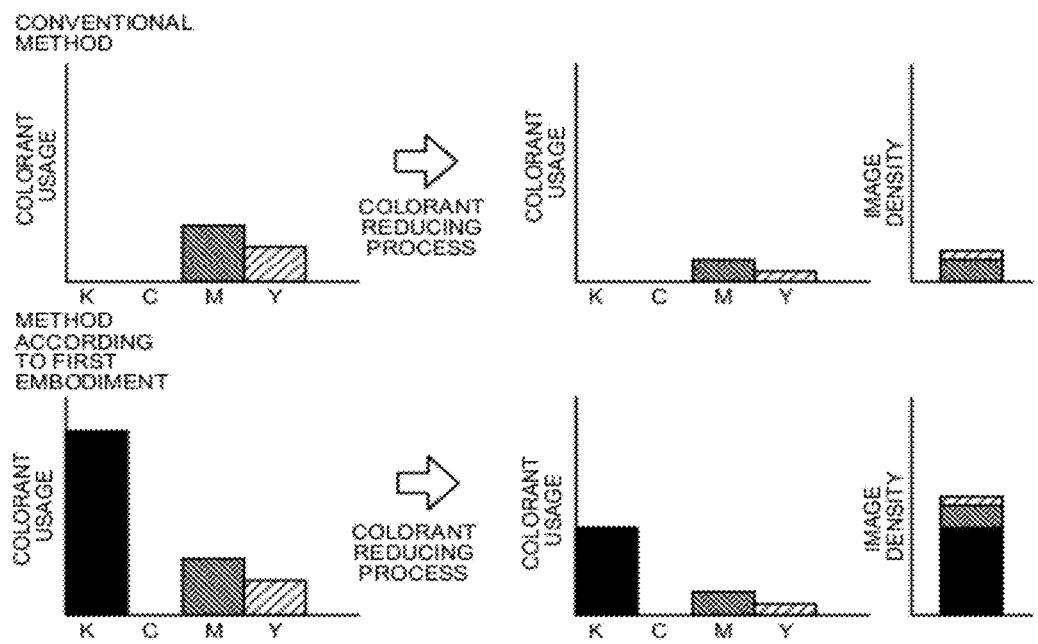
FIG. 6 is a diagram for comparison between a colorant-usage reduction effect of a method according to the first embodiment and a colorant-usage reduction effect of a conventional method.
Figure 7:
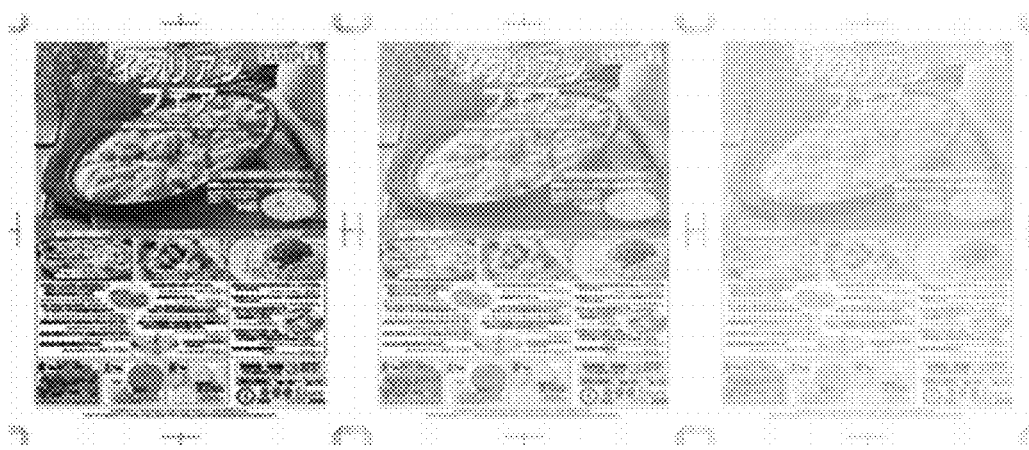
FIG. 7 is a diagram illustrating images formed with colorant of which usage is reduced by using a first method of a conventional technique.

As described above, according to the first embodiment, not only the CMM conversion but also monochrome conversion is performed on target image data, from which an image is to be formed. Image data resultant from the monochrome conversion is used as image data for K-separation of image data resultant from the CMM conversion in lieu of image data for K-separation resultant from the CMM conversion. Put another way, a monochromatic image is incorporated as a background into an image to be represented as a full-color image. Accordingly, even portions of light colors can be reproduced as monochromatic image portions. Meanwhile, a monochromatic image generally has contrast higher than that of an image of a single color other than black. Accordingly, by incorporating a monochromatic image into an image to be represented in multiple colors other than black as a background, color density that is decreased by the colorant reducing process can be raised. Therefore, as illustrated in FIG. 6, according to the configuration of the first embodiment, an image is formed by using colorant for K-separation and slight amounts of the colorants of the colors other than black. Although this image is formed by using the colorant for K-separation unlike an image formed according to the first method (see FIG. 7) described above as a conventional technique, at least tints of colors can be reproduced. Thus, the configuration according to the first embodiment makes it possible to form an image of higher image quality.

Furthermore, according to the first embodiment, not only an image of an object, such as a picture object, can be reproduced with image quality higher than that formed with a conventional technique, but also decline in ease of recognition of an object, such as a character object or a line drawing object, can be prevented. This is because a monochromatic image serves as a background as described above. Thus, according to the first embodiment, high image quality can be achieved for any one of a picture object, a character object, a line drawing object, and a graphics object. Accordingly, the need of switching as to whether image processing is to be performed in the colorant reducing mode on an object-by-object basis, which is to be performed according to the fifth method described above as a conventional technique, is eliminated. This allows minimizing influences on throughput or cost to be expended for construction of an image processing apparatus body. Furthermore, the configuration according to the first embodiment is applicable to a relatively inexpensive image forming apparatus because processing load for reducing colorant usage is relatively small.

Figure 8:
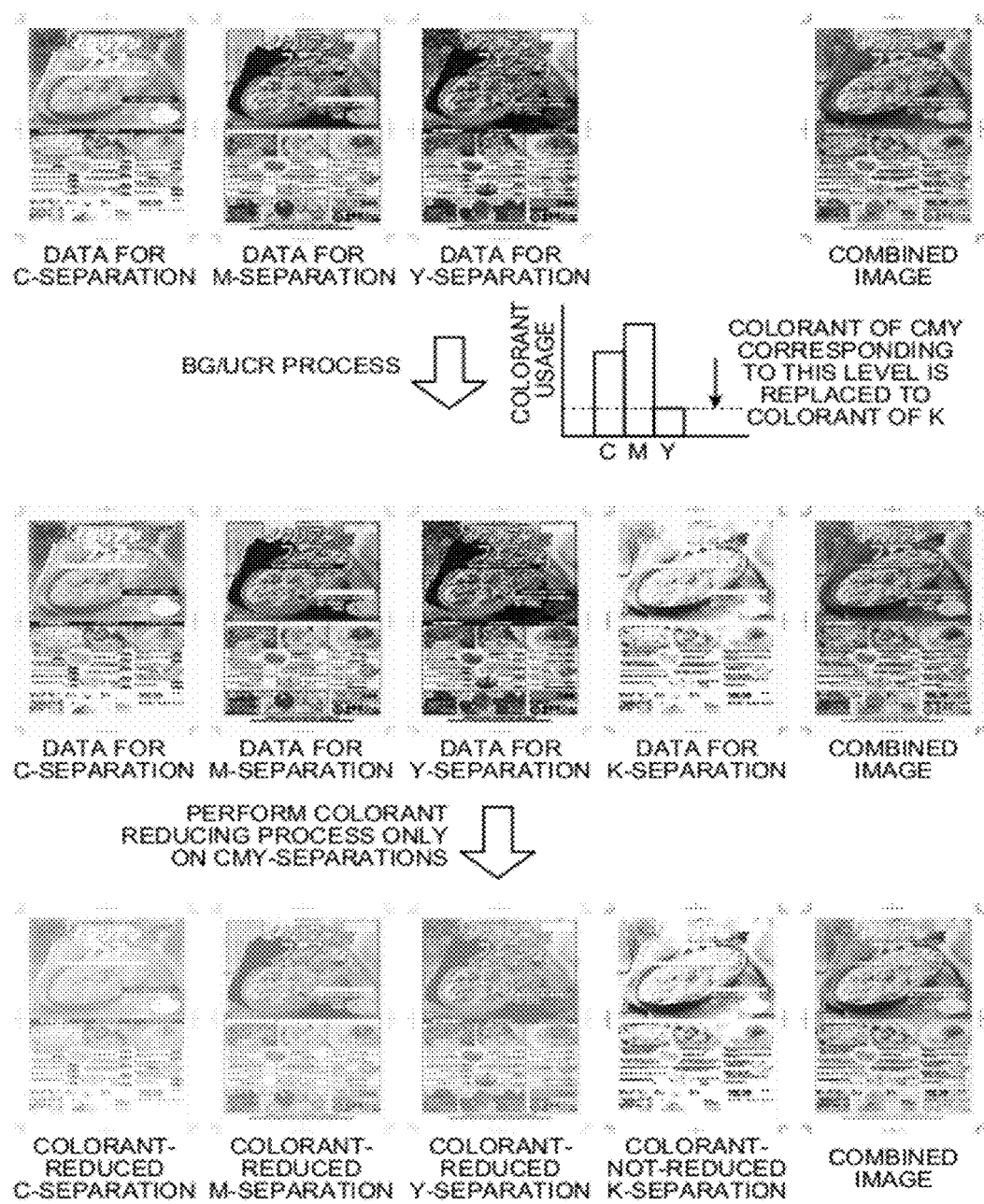
FIG. 8 is a diagram showing images formed with colorant usage reduced by utilizing a BG/UCR process of a third method of a conventional technique.

Meanwhile, the BG/UCR process (see FIG. 8) of the third method described above as a conventional technique causes only portions where CMY-separations are overlaid on one another to be replaced with K-separation. Accordingly, when colorant usage is reduced by a large amount, there is a possibility that information to be obtained from a portion expressed in a single light color in an image to be formed is completely lost. However, according to the first embodiment, even when colorant usage is reduced by a large amount, contrast and texture are ensured. Accordingly, complete loss of information to be obtained from even a light color portion can be avoided.

Second Embodiment

A second embodiment of the present invention will be described below. Note that portions that are common between the first embodiment and the second embodiment are described by using like reference numerals and symbols, or descriptions about the portions are omitted.

In the first embodiment, on the monochrome conversion route, target image data, from which an image is to be formed, is subjected to the monochrome conversion performed by the monochrome conversion unit 100, and thereafter subjected to the colorant reducing process performed by the first colorant reducing unit 102, while, on the full-color conversion route, the target image data is subjected to the CMM conversion performed by the CMM conversion unit 101, and thereafter subjected to the colorant reducing process performed by the second colorant reducing unit 103. In contrast, in the second embodiment, target image data is subjected to the colorant reducing process performed by the first colorant reducing unit 102 and thereafter subjected to the monochrome conversion by the monochrome conversion unit 100, while the target image data is subjected to the colorant reducing process performed by the second colorant reducing unit 103 and thereafter subjected to the CMM conversion performed by the CMM conversion unit 101.

Figure 9:
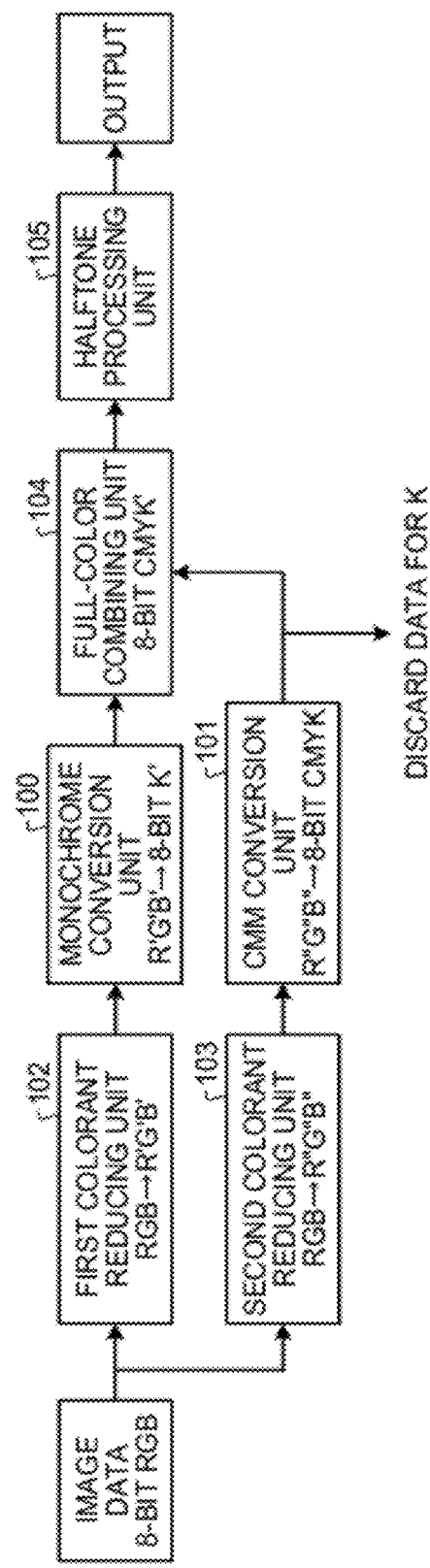
FIG. 9 is a diagram illustrating a functional configuration of an image processing section of an image processing apparatus according to a second embodiment of the present invention.

FIG. 9 is a diagram illustrating a functional configuration of an image processing section of an image processing apparatus according to the second embodiment. Units of the image processing apparatus according to the second embodiment are similar to those illustrated in FIG. 2. However, the first colorant reducing unit 102, the second colorant reducing unit 103, the monochrome conversion unit 100, the CMM conversion unit 101, and the full-color combining unit 104 provide functions that partially differ from those of the first embodiment.

In the second embodiment, target 8-bit image data for each of RGB-separations, from which an image is to be formed, is input to each of the first colorant reducing unit 102 and the second colorant reducing unit 103. The first colorant reducing unit 102 performs the colorant reducing process on the thus-input image data representing 8-bit tone values of each of RGB-separations. More specifically, the first colorant reducing unit 102 multiplies each tone value represented by the image data by a coefficient that is equal to or greater than zero and less than or equal to one for each of RGB-separations to thereby output 8-bit image data representing tone values multiplied by the coefficient for each of the RGB-separations. The coefficient for use in the multiplication may be that described in the first embodiment with reference to FIGS. 3B and 3C.

The monochrome conversion unit 100 performs the monochrome conversion on the image data representing 8-bit tone values of each of RGB-separations output from the first colorant reducing unit 102 to thereby output image data representing 8-bit tone values of K-separation. As a method for performing the monochrome conversion, a method similar to that employed in the first embodiment can be used.

Subsequently, the second colorant reducing unit 103 performs the colorant reducing process on the thus-input image data representing 8-bit tone values of each of RGB-separations. More specifically, for instance, the second colorant reducing unit 103 multiplies each tone value represented by the image data by a coefficient that is equal to or greater than zero and less than or equal to one to thereby output 8-bit image data representing tone values multiplied by the coefficient for each of RGB-separations. The coefficient for use in the multiplication may be that described in the first embodiment with reference to FIGS. 3B and 3C. However, as in the first embodiment, the coefficient, by which each tone value is multiplied by the second colorant reducing unit 103, is preferably smaller than or equal to the coefficient, by which each tone value is multiplied by the first colorant reducing unit 102. It is more preferable that the former coefficient is smaller than the latter coefficient.

The continuation of the description with reference to FIG. 9 will be given below. The CMM conversion unit 101 performs the monochrome conversion on the image data representing 8-bit tone values of each of RGB-separations output from the first colorant reducing unit 102 to thereby output image data representing 8-bit tone values of each of CMYK-separations. As a method for performing the CMM conversion, a method similar to that employed in the first embodiment can be used.

The full-color combining unit 104 combines the image data for K-separation output from the monochrome conversion unit 100 and the image data for each of CMY-separations, which is a portion of the image data for each of CMYK-separations output from the CMM conversion unit 101, to thereby output 8-bit image data for each of CMYK-separations.

Figure 10:
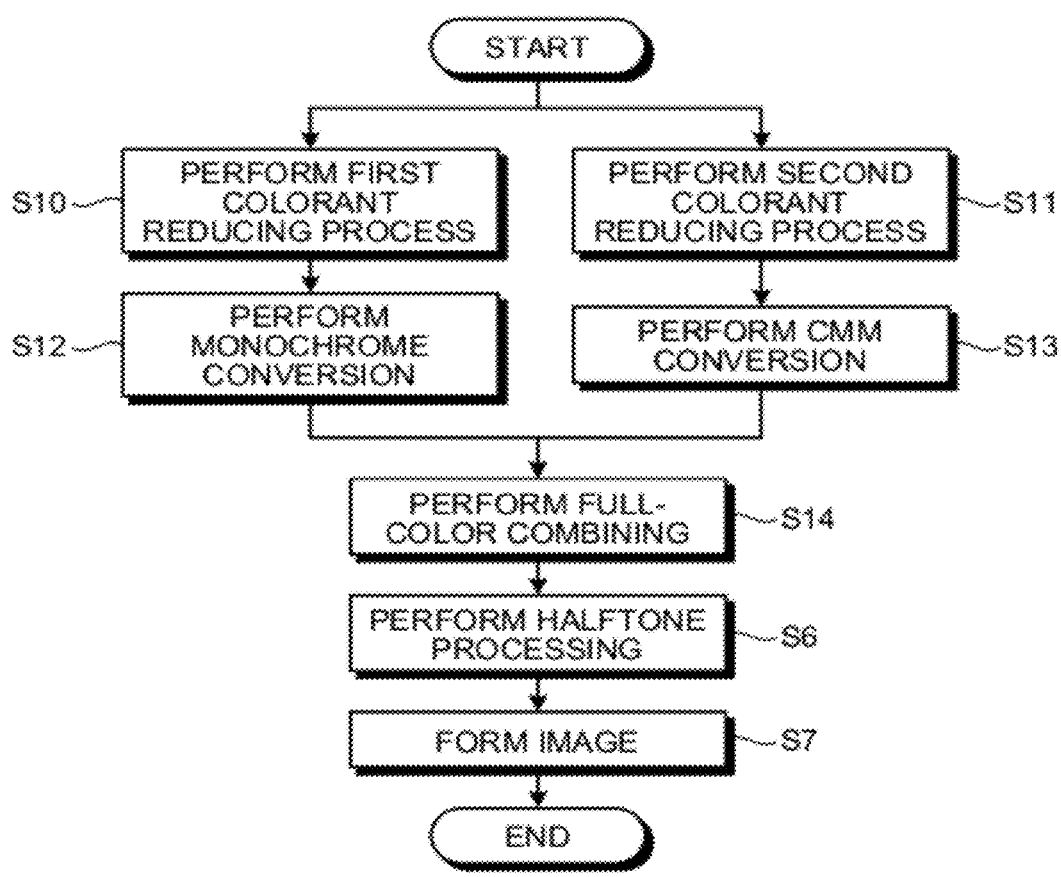
FIG. 10 is a flowchart of a procedure of an image forming process to be performed by the image processing apparatus according to the second embodiment.

The procedure for an image forming process to be performed by the image processing apparatus according to the second embodiment will be described with reference to FIG. 10. The image processing apparatus performs the colorant reducing process described above on target 8-bit image data for each of RGB-separations, from which an image is to be formed, by using the function of the first colorant reducing unit 102 to thereby output colorant-reduced 8-bit image data for each of RGB-separations (Step S10). The image processing apparatus also performs the colorant reducing process described above on the target 8-bit image data for each of RGB-separations by using the function of the second colorant reducing unit 103 to thereby output colorant-reduced 8-bit image data for each of RGB-separations (Step S11).

The image processing apparatus performs the monochrome conversion by using the function of the monochrome conversion unit 100 on the 8-bit image data for each of RGB-separations output at Step S10 to thereby output 8-bit image data for K-separation (Step S12). The image processing apparatus also performs the CMM conversion by using the function of the CMM conversion unit 101 on the 8-bit image data for each of the RGB-separations output at Step S11 to thereby output image data representing 8-bit tone values of each of CMYK-separations (Step S13).

Thereafter, the image processing apparatus combines the image data for K-separation output at Step S12 and 8-bit image data for each of CMY-separations, which is a portion of the image data for each of CMYK-separations output at Step S13, by using the function of the full-color combining unit 104 to thereby output 8-bit image data for each of CMYK-separations (Step S14). Operations to be performed at subsequent Steps S6 and S7 are similar to those of the first embodiment.

As described, even when the colorant reducing process is performed before the monochrome conversion and the CMM conversion, a high-quality image can be formed with colorant usage reduced by a large amount.

Third Embodiment

A third embodiment of the present invention will be described below. Note that portions that are common between any one of the first embodiment and the second embodiment, and the third embodiment are described by using like reference numerals and symbols, or descriptions about the portions are omitted.

An image processing apparatus according to the third embodiment performs the color conversion on target image data, from which an image is to be formed, via each of the monochrome conversion route and the full-color conversion route in the manner as described above; however, in the third embodiment, the image processing apparatus performs the colorant reducing process during the monochrome conversion, and also performs the colorant reducing process during the CMM conversion.

Figure 11:
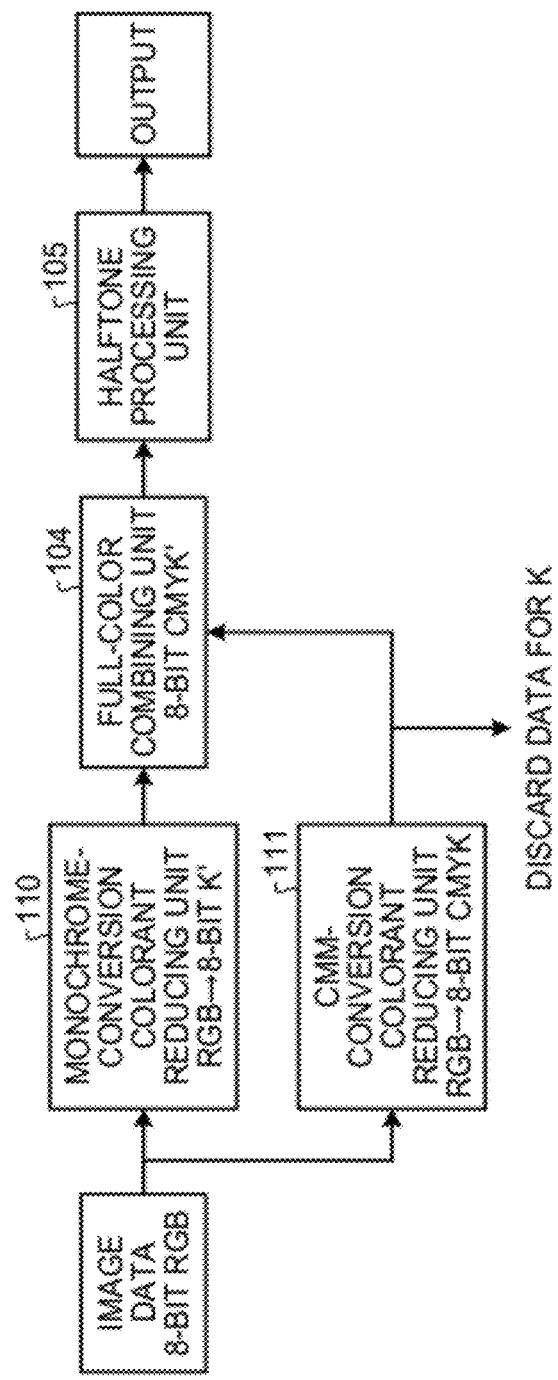
FIG. 11 is a diagram illustrating a functional configuration of an image processing section of an image processing apparatus according to a third embodiment of the present invention.

FIG. 11 is a diagram illustrating a functional configuration of an image processing section of the image processing apparatus according to the third embodiment. The image processing apparatus according to the third embodiment includes a monochrome-conversion colorant reducing unit 110, a CMM-conversion colorant reducing unit 111, the full-color combining unit 104, and the halftone processing unit 105. A function of the monochrome-conversion colorant reducing unit 110 and a function of the CMM-conversion colorant reducing unit 111 are implemented by any one of execution of the various types of program instructions stored in the MEM-P 12 or the HDD 18 by the CPU 11 and the image processing section included in the ASIC 16 and the engine unit 60. In the third embodiment, the monochrome-conversion colorant reducing unit 110 performs the color conversion and the colorant reducing process via the monochrome conversion route, while the CMM-conversion colorant reducing unit 111 performs the color conversion and the colorant reducing process via the full-color conversion route. Details of these will be described below.

In the third embodiment, target 8-bit image data for each of RGB-separations, from which an image is to be formed, is input to each of the monochrome-conversion colorant reducing unit 110 and the CMM-conversion colorant reducing unit 111. The monochrome-conversion colorant reducing unit 110 performs the monochrome conversion on the thus-input 8-bit image data for each of RGB-separations by using an equation for reducing colorant usage to thereby output 8-bit image data for K-separation. The equation for reducing colorant usage is a first or higher order polynomial in which, for image data of each of separations, tone values represented by the image data for each of the separations are assigned to variables. Equation (2) and (3) below are examples of the equation.

$$K=(R\times 306+G\times 601+B\times 117)/1024\times n \; (0<n\leq 1) \quad (2)$$

$$K=((R\times 306+G\times 601+B\times 117)/1024)-n \; (0\leq n<255) \quad (3)$$

The CMM-conversion colorant reducing unit 111 performs the CMM conversion on the thus-input 8-bit image data for each of RGB-separations by using a colorant reduction LUT, thereby converting tone values of each of RGB-separations represented by the image data into tone values of each of CMYK-separations. Thus, the CMM-conversion colorant reducing unit 111 outputs image data representing 8-bit tone values of each of CMYK-separations. The colorant reduction LUT contains tone values of each of RGB-separations associated with tone values, which are multiplied by a coefficient for reducing colorant usage in advance, of each of CMKY-separations. The colorant reduction LUT is stored in, e.g., the HDD 18 in advance.

The full-color combining unit 104 combines the image data for K-separation output from the monochrome-conversion colorant reducing unit 110 and image data for each of CMY-separations, which is a portion of the image data for each of CMYK-separations output from the CMM-conversion colorant reducing unit 111, to thereby output 8-bit image data for each of CMYK-separations.

Figure 12:
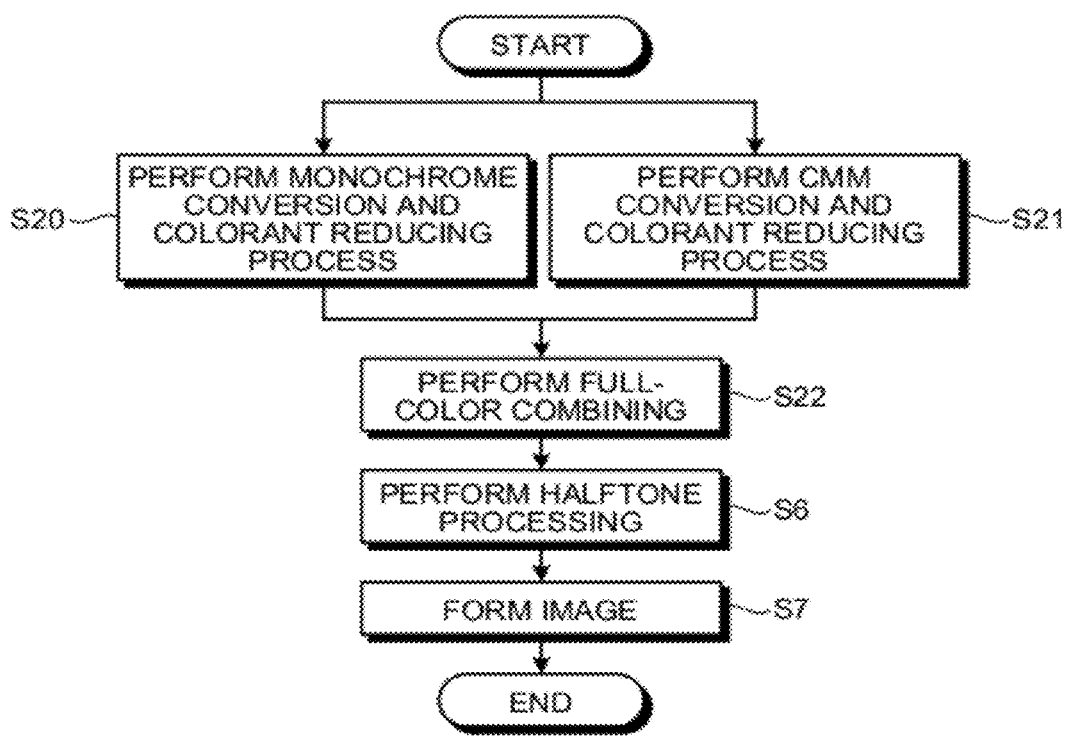
FIG. 12 is a flowchart of a procedure of the image forming process to be performed by the image processing apparatus according to the third embodiment.

The procedure for an image forming process to be performed by the image processing apparatus according to the third embodiment will be described with reference to FIG. 12. When the image processing apparatus performs the monochrome conversion by using the function of the monochrome-conversion colorant reducing unit 110 on target 8-bit image data for each of RGB-separations, from which an image is to be formed, the image processing apparatus uses the equation (see Equation (2), (3), for example) for reducing colorant usage to thereby output 8-bit image data for K-separation (Step S20). When the image processing apparatus performs the CMM conversion described above on the target 8-bit image data for each of RGB-separations, the image processing apparatus uses the colorant reduction LUT to thereby output image data representing 8-bit tone values of each of CMYK-separations (Step S21). Thereafter, the image processing apparatus combines the image data for K-separation output at Step S20 and 8-bit image data for each of CMY-separations, which is a portion of the image data for each of CMYK-separations output at Step S21, by using the function of the full-color combining unit 104 to thereby output 8-bit image data for each of CMYK-separations (Step S22). Operations to be performed at subsequent Steps S6 and S7 are similar to those of the first embodiment.

The configuration according to the third embodiment described above makes it possible to form a high-quality image with colorant usage reduced by a large amount and also makes high-speed, accurate color conversion possible by performing the colorant reducing process during the monochrome conversion and performing the colorant reducing process during the CMM conversion.

Fourth Embodiment

A fourth embodiment of the present invention will be described below. Note that portions that are common between the first to third embodiments, and the fourth embodiment are described by using like reference numerals and symbols, or descriptions about the portions are omitted.

Figure 13:
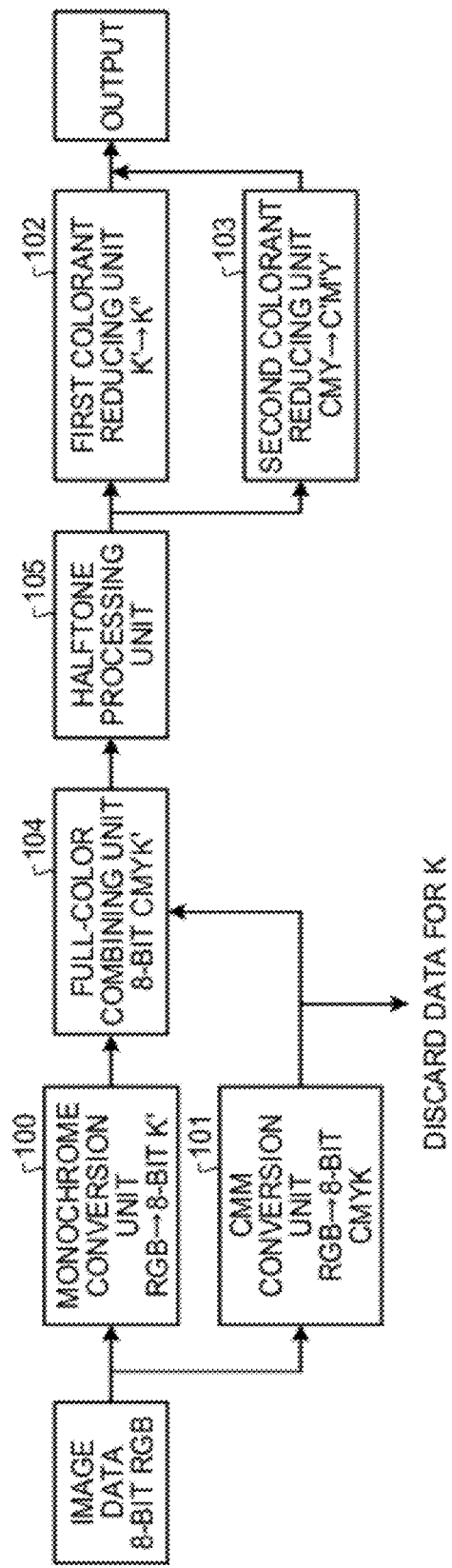
FIG. 13 is a diagram illustrating a functional configuration of an image processing section of an image processing apparatus according to a fourth embodiment of the present invention.

Although an image processing apparatus according to the fourth embodiment performs the color conversion process on target image data, from which an image is to be formed, via each of the monochrome conversion route and the full-color conversion route in a manner as described above, the image processing apparatus according to the fourth embodiment performs the colorant conversion process after a halftone process. FIG. 13 is a diagram illustrating a functional configuration of an image processing section of the image processing apparatus according to the fourth embodiment. Units of the image processing apparatus according to the fourth embodiment are similar to those illustrated in FIG. 2. However, the full-color combining unit 104, the first colorant reducing unit 102, and the second colorant reducing unit 103 provide functions that partially differ from those of the first embodiment.

The full-color combining unit 104 combines image data for K-separation output from the monochrome conversion unit 100 and image data for each of CMY-separations, which is a portion of image data for each of CMYK-separations output from the CMM conversion unit 101, to thereby output 8-bit image data for each of CMYK-separations.

Figure 14A:
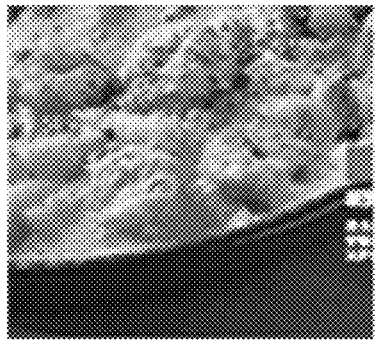
FIGS. 14A and 14B are diagrams illustrating dot thinning, FIG. 14A depicting a state where dots are not thinned out, FIG. 14B depicting a state where dots are thinned out at a dot thinning rate of 50%.
Figure 14B:
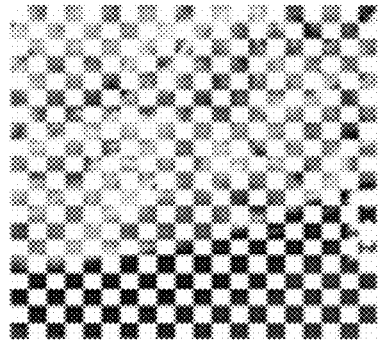

The first colorant reducing unit 102 performs the colorant reducing process on dot pattern data for K-separation output from the halftone processing unit 105. More specifically, for instance, the first colorant reducing unit 102 thins out (discards) dots arranged in a dot pattern represented by the dot pattern data for K-separation at a dot thinning rate equal to or greater than 0% and less than or equal to 100% to thereby output dot pattern data representing a dot pattern in which not-discarded dots are arranged. FIGS. 14A and 14B are diagrams illustrating dot thinning. FIG. 14B depicts a state where dots are thinned out at a dot thinning rate of 50% from a state depicted in FIG. 14A where dots are not thinned out.

The continuation of the description with reference to FIG. 13 will be given below. The second colorant reducing unit 103 performs the colorant reducing process on the dot pattern data for CMY-separations output from the halftone processing unit 105. More specifically, for instance, for each of dot pattern data for C-separation, dot pattern data for M-separation, and dot pattern data for Y-separation, as does the first colorant reducing unit 102, the second colorant reducing unit 103 thins out dots arranged in a dot pattern represented by the dot pattern data at a dot thinning rate equal to or greater than 0% and less than or equal to 100% to thereby output dot pattern data representing a dot pattern in which not-discarded dots are arranged.

The engine unit 60 performs printing by using the dot pattern data for K-separation output from the first colorant reducing unit 102 and the dot pattern data for each of CMY-separations output from the second colorant reducing unit 103. As a method for performing the printing, a method similar to that employed in the first embodiment can be used.

Figure 15:
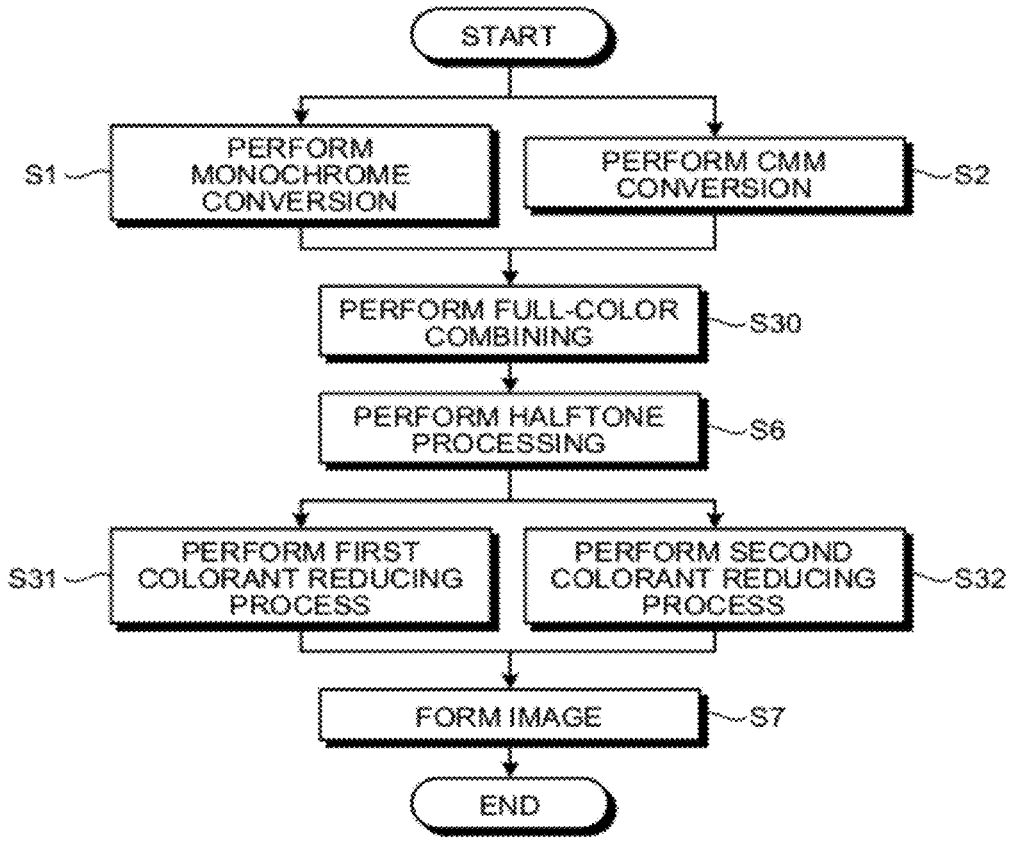
FIG. 15 is a flowchart of a procedure of an image forming process to be performed by the image processing apparatus according to the fourth embodiment.

The procedure for an image forming process to be performed by the image processing apparatus according to the fourth embodiment will be described with reference to FIG. 15. Operations to be performed at Steps S1 and S2 are similar to those of the first embodiment. At Step S30, the image processing apparatus combines the 8-bit image data for K-separation output at Step S1 and the 8-bit image data for each of CMY-separations, which is the portion of the image data for each of CMYK-separations output at Step S2, by using the function of the full-color combining unit 104 to thereby output 8-bit image data for each of CMYK-separations. An operation to be performed at subsequent Step S6 is similar to that of the first embodiment. At Step S31, the image processing apparatus performs the colorant reducing process on dot pattern data for K-separation, which is a portion of the dot pattern data for each of CMYK-separations output at Step S6, by using the function of the first colorant reducing unit 102 to thereby output dot pattern data for K-separation having undergone the colorant reducing process. At Step S32, the image processing apparatus performs the colorant reducing process on the dot pattern data for each of CMY-separations, which is a portion of the dot pattern data for each of CMYK-separations output at Step S6, by using the function of the second colorant reducing unit 103 to thereby output dot pattern data for each of CMY-separations having undergone the colorant reducing process. An operation to be performed at subsequent Step S7 is similar to that of the first embodiment.

The configuration according to the fourth embodiment described above also makes it possible to form a high-quality image with colorant usage reduced by a large amount.

MODIFICATIONS

The present invention is not limited to the embodiments discussed above, and when being practiced, constitutional elements of the invention can be modified without departing from the spirit of the invention. In addition, various embodiments can be made by suitably combining the constituent elements disclosed in the embodiments. For example, some constitutional elements can be omitted from all the constitutional elements described in the embodiments. Constitutional elements of different embodiments can be suitably combined. Various modifications, some of which are described below, can be made.

Program instructions to be executed by the image processing apparatus according to each of the embodiments may be stored in a computer connected to a network such as the Internet so that the program instructions are provided by downloading over the network. The program instructions may be stored in a computer-readable recording medium, such as a compact disk read only memory (CD-ROM), a flexible disk (FD), a compact disk recordable (CD-R), or a digital versatile disk (DVD), in an installable format or an executable format so that the program instructions are provided as a computer program product.

Although the image processing apparatus according to each of the embodiments described above includes the engine unit 60, the image processing apparatus does not necessarily include the engine unit 60. In this case, an image forming system, in which the image processing apparatus is connected to an image forming apparatus that includes colorants of CMYK, a paper cassette, and an image forming engine that forms an image as does the engine unit 60, should preferably be constructed. This system can be configured such that the image processing apparatus transmits dot pattern data generated as described above in each of the embodiments to the image forming apparatus, which in turn forms an image on a printing medium by using the dot pattern data.

The functional configuration of the image processing section of the image processing apparatus according to each of the embodiments described above with reference to FIGS. 2, 9, 11, and 13 may be incorporated as a function of a printer driver; alternatively, they may be implemented as a plug-in function of application program; further alternatively, they may be implemented by separate application program that interfaces between the application program and the printer driver.

The monochrome conversion and/or the CMM conversion itself can be performed by using a conventional technique. Accordingly, the functional configuration of the image processing section of the image processing apparatus according to each of the embodiments described above with reference to FIGS. 2, 9, 11, and 13 may be implemented as hardware into an image processing chip, such as the ASIC 16.

In each of the embodiments described above, the CMYK colorants are used by the engine unit 60 to form an image. However, colorants to be used are not limited thereto, and may be colorant of light color (light cyan, light magenta, or the like) or colorant of spot color (red, blue, green, or the like). According to the configuration of each of the embodiments described above, when an image is to be formed with such colorant, even if colorant usage of each of light color separation(s) and/or spot color separation(s) is reduced by a large amount, an undesirable result that information that should be obtained from a printed image is completely lost can be avoided.

In each of the embodiments described above, image data to be input as target image data, from which an image is to be formed, is image data for the RGB color system. However, the image data is not limited thereto, and may be image data for the XYZ color system or other various color system.

In each of the embodiments described above, a four-drum color plotter is used as the engine unit 60 of the image processing apparatus; however, the engine unit 60 is not limited thereto. The image processing apparatus may further include a scanner so that the image processing apparatus functions as a copier. Objects in an image read by a scanner are all considered as picture objects without drawing a distinction between a character object and a picture object. Accordingly, to determine a type of each object, performing an image-area separation process is generally required. However, in each of the embodiments described above, even when printing is to be performed by using image data representing an image read with a scanner, the image processing apparatus can form a high-quality image with colorant usage reduced by a large amount irrespective of which object is contained in the image.

In each of the embodiments described above, the colorant reducing process is performed on image data for K-separation having undergone the monochrome conversion. Alternatively, a configuration, in which switching as to whether to perform the colorant reducing process on image data for K-separation is performed, may be employed. This switching is to be performed, for instance, in response to an operation input entered by a user by using the operation input unit 20.

For instance, in a situation where a user has entered by using the operation input unit 20 an operation input requesting not to perform the colorant reducing process on image data for K-separation, the image processing apparatus according to the first embodiment should preferably skip Step S3 subsequent to Step S1 of FIG. 4, and combine 8-bit image data for K-separation output at Step S1 and 8-bit image data for each of CMY-separations output at Step S4 to thereby output 8-bit image data for each of CMYK-separations. The image processing apparatus according to the second embodiment should preferably perform the operation to be performed Step S1 without performing the operation to be performed Step S10 of FIG. 10. The image processing apparatus according to the third embodiment should preferably perform, as in the first embodiment, the monochrome conversion by using Equation (1) at Step S20 of FIG. 12. The image processing apparatus according to the fourth embodiment should preferably skip Step S31 of FIG. 15. In each of the embodiments described above, colorant is used most to form an image based on image data for K-separation having undergone the monochrome conversion. Accordingly, it is desirable to perform the colorant reducing process on this image data. However, for instance, in a situation where remaining amounts of the colorants are sufficient, an image of higher quality can be provided with colorant usage reduced by not performing the colorant reducing process on image data for K-separation having undergone the monochrome conversion according to an operation input entered by a user. This facilitates convenience for the user.

Further alternatively, a configuration in which the image processing apparatus detects whether the remaining amounts of the colorants are equal to or higher than a predetermined level, and switches whether to perform or not the colorant reducing process on image data for K-separation having undergone the monochrome conversion according to a result of the detection may be employed.

Each of the embodiments described above yields its specific effect in a situation where colorant usage is reduced by a large amount. However, in a situation where a necessary reducing amount of colorant usage is small, a high-quality image can be formed even when colorant usage is reduced according to an appropriate one of the methods described in relation to the conventional technique. Accordingly, a configuration in which whether to apply the colorant reducing process of one of the embodiments or to apply a colorant reducing process of the conventional technique is switchable according to the remaining amounts of the colorants may be employed. Such a configuration facilitates convenience for a user.

Figure 16:
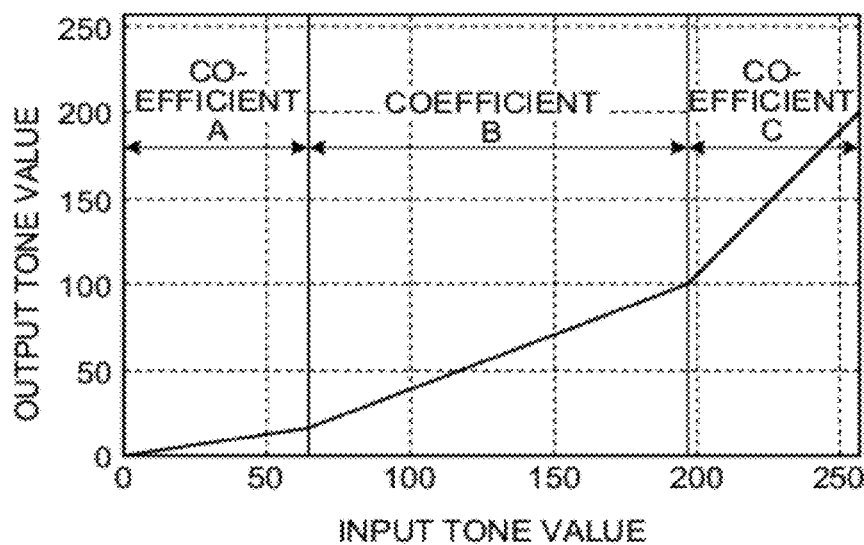
FIG. 16 is a diagram of an example of coefficients, by which tone values are to be multiplied, according to a modification.
Figure 17:
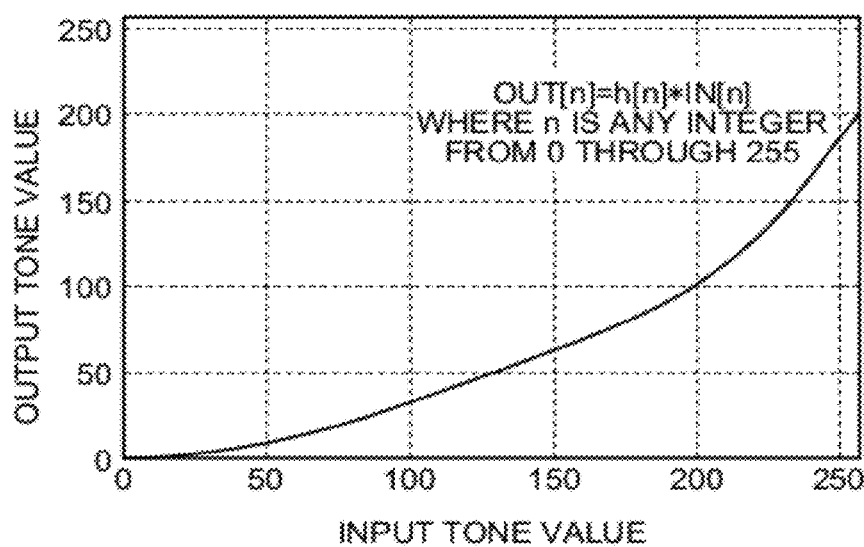
FIG. 17 is a diagram of an example of coefficients, by which tone values are to be multiplied, according to another modification.

The image processing apparatus according to each of the first to third embodiments multiples each tone value by a predetermined coefficient in the colorant reducing process. However, no limitation is imposed on a method of multiplying each tone value by the coefficient. For instance, the image processing apparatus may multiply all tone values by a same coefficient uniformly. Alternatively, another configuration may be employed. In this configuration, as illustrated in FIG. 16, tone values are segmented into a plurality of segments, to which different coefficients are assigned in advance. A coefficient table containing information about relationship between the segments and the coefficients is stored in, e.g., the HDD 18. The image processing apparatus performs the colorant conversion process by referring to the coefficient table and multiplying each tone value represented by image data by one of the coefficients associated with the corresponding segment. Alternatively, still another configuration may be employed. In this configuration, as illustrated in FIG. 17, relationship between tone values and coefficients in a one-to-one correspondence is determined in advance. A coefficient table containing information about the relationship is stored in, e.g., the HDD 18. The image processing apparatus performs the colorant conversion process by referring to the coefficient table and multiplying each tone value represented by image data by one of the coefficients associated with the tone value.

Figure 18:
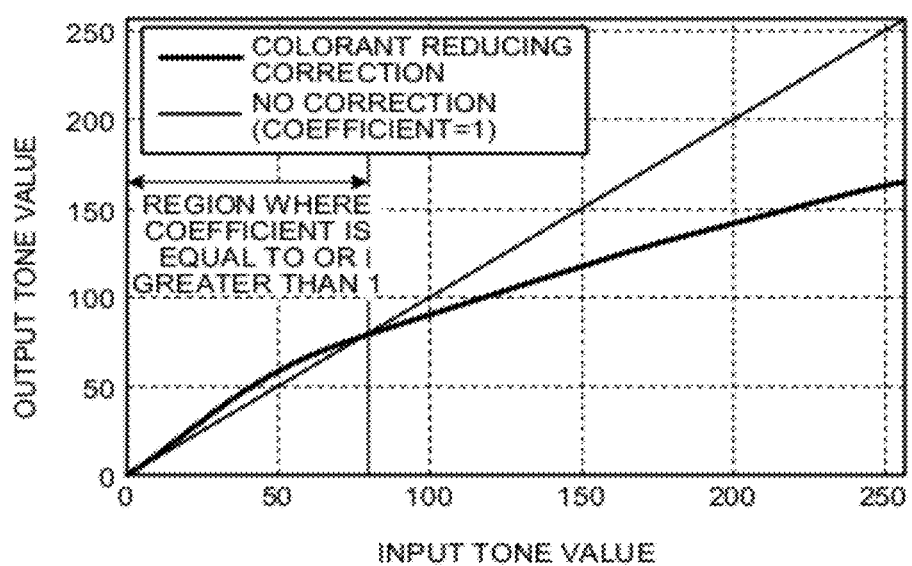
FIG. 18 is a diagram of an example of coefficients, by which tone values are to be multiplied, according to still another modification.

For the image processing apparatus, all coefficients, by which tone values are to be multiplied, in the colorant reducing process are not necessarily equal to or greater than zero and less than or equal to one. As illustrated in FIG. 18, one or more coefficients, by each of which one or more tone values are to be multiplied, may be greater than one. In a situation where, for instance, the engine unit 60 of the image processing apparatus is an engine that forms an image by an electrophotographic method, it is difficult to form fine dots that are typically used in a highlight of an image. Accordingly, in such a situation, tone values are increased in some cases. When a tone value multiplied by a coefficient is lower than a minimum tone value required to express a highlight of an image, image quality is undesirably declined by a cause other than reduction of colorant usage. In view of this, in some cases it is effective to multiply a tone value by a coefficient greater than one so that an image is formed in a density higher than that of input target image data, from which the image is to be formed, to thereby improve reproducibility of the image. Whether it can be effective to multiply a tone value by a coefficient greater than one depends on a model of the image processing apparatus. Accordingly, an image processing apparatus of such a model should preferably be configured such that, when a tone value of a pixel belonging to a highlight of an image is less than or equal to a predetermined value, the tone value is multiplied by a coefficient greater than one.

In each of the embodiments described above, image data for K-separation is not eventually used on the full-color conversion route. Accordingly, the BG/UCR process may be omitted from the full-color conversion process. However, to increase the effect of colorant usage reduction of each of color separations, the image processing apparatus should preferably perform the BG/UCR process as illustrated in FIG. 19 to actively delete a region where color separations are overlaid on one another, and thereafter discard image data for K-separation.

The image processing apparatus according to each of the embodiments may switch an amount, by which colorant usage is to be reduced, depending on a type of an object, such as a character object, a line drawing object, a graphics object, or a picture object. For example, image data to be managed by an OS, such as Windows (registered trademark), includes object information about objects contained in an image to be represented by the image data. The image processing apparatus should preferably perform the colorant reducing process on each object contained in an image represented by image data by referring to such object information contained in the image data. For example, the image processing apparatus should preferably set an amount, by which colorant usage is to be reduced, of a character object or a line drawing object contained in an image represented by image data on the monochrome conversion route where the monochrome conversion is performed to be less than that of the other objects. More specifically, for instance, the image processing apparatus according to any one of the first to third embodiments should preferably set a coefficient, by which tone values that express a character object or a light drawing object are to be multiplied, to be greater than a coefficient, by which tone values that express the other objects are to be multiplied, in the colorant reducing process on the monochrome conversion route. Such a configuration makes it possible to reproduce a character and/or line drawing portion in an image to be formed more sharply to thereby enhance readability of the portion.

Figure 20A:
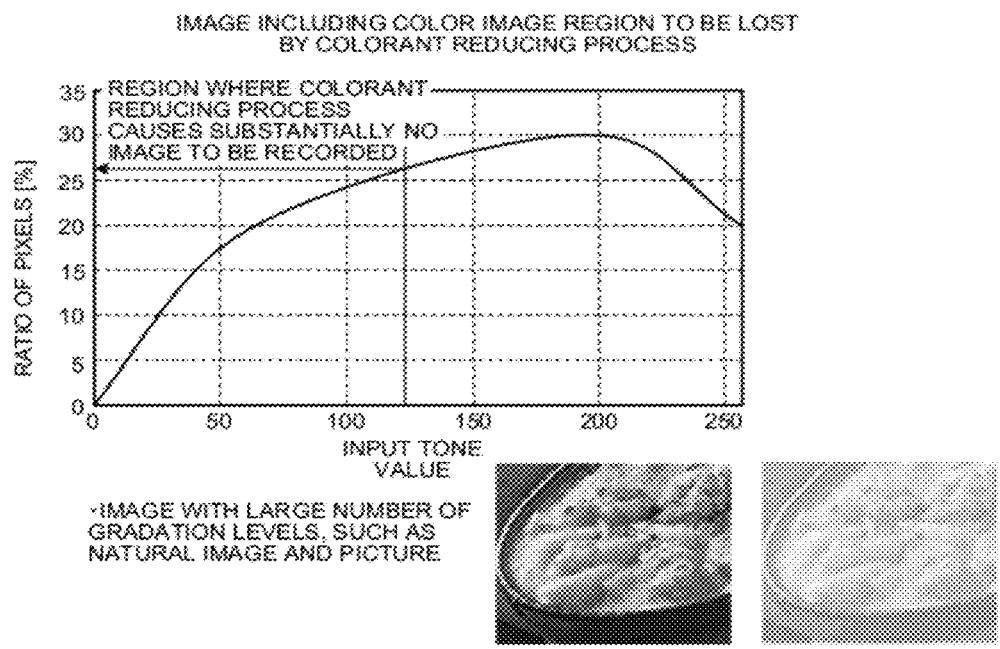
FIGS. 20A and 20B are explanatory diagrams of a method to be performed by an image processing apparatus according to still another modification of analyzing an object contained in an image represented by image data.
Figure 20B:
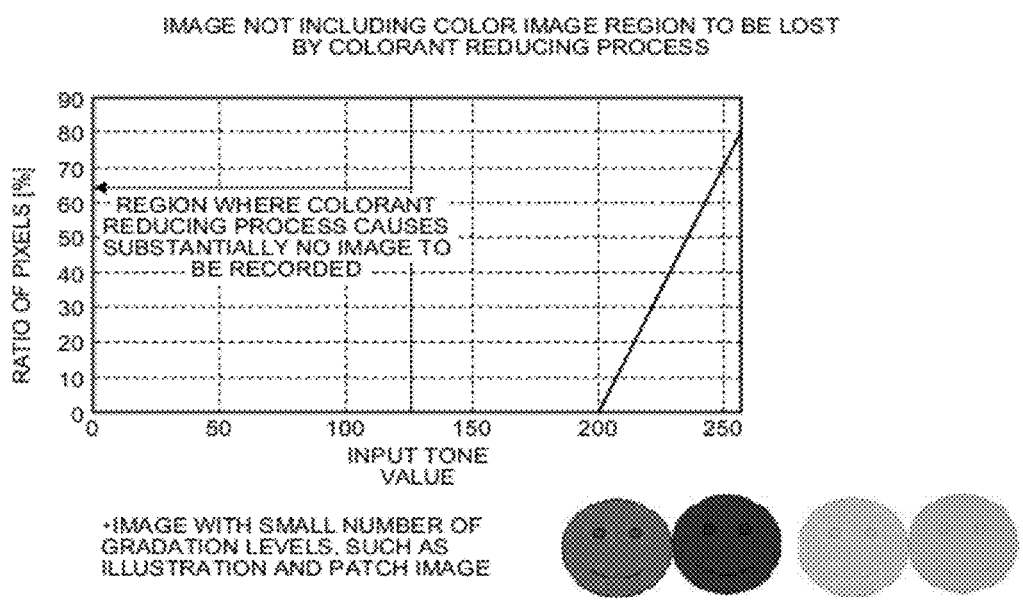

Meanwhile, more priority is placed on color fidelity than on contrast in some patterns. When a planar image of a pattern or the like, for which arrangement of colors is highly prioritized, is to be formed, the first method or the second method described in relation to the conventional technique can form the image with higher saturation and smaller shift in hue than that formed according to each of the embodiments. Accordingly, by switching between a method according to one of the embodiments and one of the conventional methods for the colorant reducing process, an image having image quality desired by a user can be provided. To implement this switching, the image processing apparatus should preferably include a configuration for performing the colorant reduction according to one of the conventional methods. This switching may be performed by the image processing apparatus in response to an operation input entered by a user by using the operation input unit 20. As illustrated in FIGS. 20A and 20B, a configuration in which objects contained in an image represented by image data are analyzed to determine whether the image to be formed has a region where information is to be lost by the colorant reducing process can be employed. With this configuration, when it is determined that the image has such a region, the colorant reducing process according to the conventional method is performed, whereas, when it is determined that the image does not have such a region, the colorant reducing process according to one of the embodiments is performed. Meanwhile, a color development state can vary depending on a combination of a printing medium, on which an image is to be formed, and the colorants. In view of this, information that specifies according to which method the colorant reducing process is to be performed can be added to a printing medium in a form of, for instance, a barcode or magnetic data. With this configuration, the image processing apparatus reads the information added to the printing medium and performs the colorant reducing process according to the method specified by the information when the image processing apparatus performs printing by using the printing medium. Alternatively, a configuration in which the image processing apparatus switches the method for the colorant reducing process depending on a type of the paper cassette that stores the printing medium or a type of the printing medium may be employed.

Placing the image processing apparatus into the colorant reducing mode is not necessarily performed in response to an operation input entered by a user by using the operation input unit 20. A configuration in which the placing is performed depending on a type of the paper cassette that stores the printing medium or a type of the printing medium may be employed.

The image processing apparatus according to each of the embodiments may be configured to perform the colorant reducing process on 8-bit image data for each of RGB-separations or image data for each of CMY-separations by using, for the image data of each of the separations, a first or higher order polynomial in which tone values represented by the image data are assigned to variables.

Figure 21:
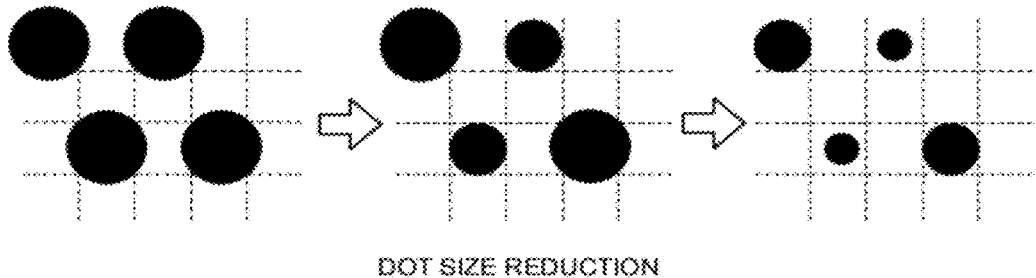
FIG. 21 is a diagram illustrating an example dot size reduction according to still another modification.

The image processing apparatus according to the fourth embodiment described above performs the colorant reducing process by thinning dots arranged in a dot pattern represented by dot pattern data at a predetermined dot thinning rate. However, the colorant reducing process is not limited thereto; for instance, as illustrated in FIG. 21, the colorant reducing process may be performed by reducing a dot size at a reduction rate equal to or greater than 0% and less than or equal to 100%. In this case, the image processing apparatus may change the number of dots to be subjected to the dot size reduction according to an amount, by which colorant usage is to be reduced. The image processing apparatus may alternatively perform the colorant reducing process by performing dot thinning and dot size reduction in a combined manner.

Figure 22:
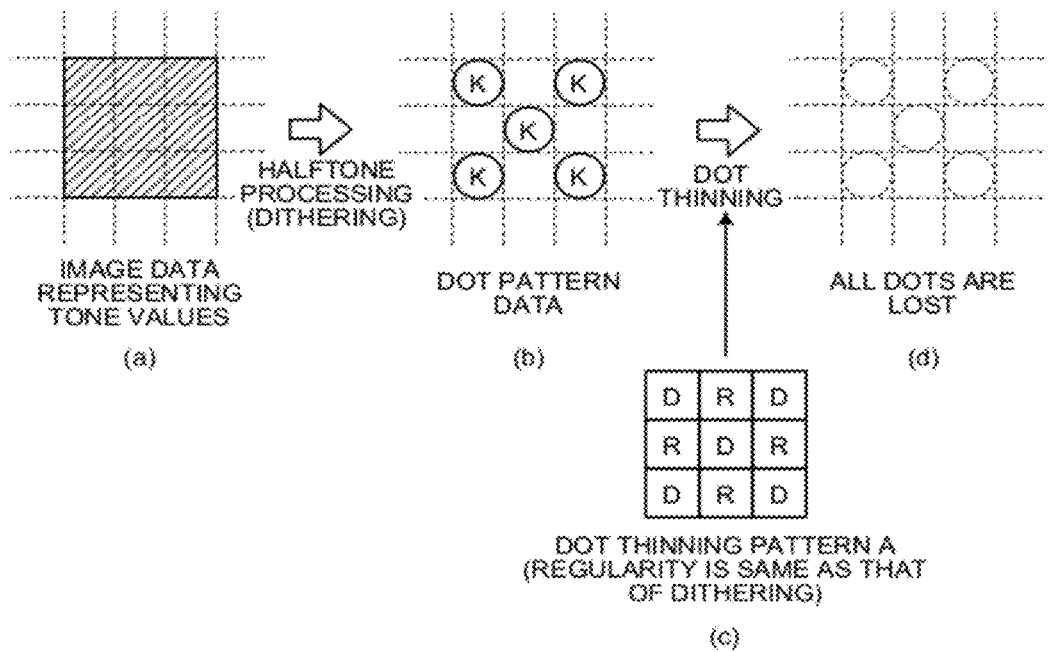
FIG. 22 is a diagram illustrating a situation where a rule for arranging dots into a dot pattern where the dots are arranged in halftone processing is the same as a rule for thinning the dots arranged in the dot pattern in the colorant reducing process, in which (a) being a diagram illustrating image data representing tone values, (b) being a diagram illustrating the dot pattern into which the dots are arranged in the halftone processing, (c) being a diagram visualizing the rule for thinning the dots arranged in the dot pattern, and (d) being a diagram illustrating a state where dots are discarded from the dot pattern in the colorant reducing process.

The image processing apparatus according to the fourth embodiment is desirably configured such that a rule for arranging dots into the dot pattern, in which the dots are arranged, in the halftone processing differs from a rule for thinning the dots arranged in the dot pattern in the colorant reducing process as far as possible. More specifically, for instance, in a situation where dot pattern data representing a dot pattern, in which dots are arranged according to a rule that dots (indicated by "K" in FIG. 22) should be arranged in a checkerboard pattern as illustrated in (b) of FIG. 22, is output from image data representing tone values illustrated in (a) of FIG. 22, if dot thinning is performed according to a rule that dots at positions that form a checkerboard pattern should be discarded as illustrated in (c) of FIG. 22 (i.e., dots indicated by "D", which means "discarded", are discarded, while dots indicated by "R", which means "remaining", are left), all the dots can be lost. There can also be a case where no dot is undesirably discarded. In view of this, as illustrated in (c') of FIG. 23, the rule for dot thinning in the colorant reducing process should preferably differ from the rule for arranging dots in the halftone processing. When configured in this manner, dots at positions where dots that are arranged in the halftone processing and dots that are to be discarded in the colorant reducing process stochastically overlap on each other are to be discarded. Accordingly, as illustrated in (d') of FIG. 23, dot thinning that depends on a colorant reducing amount can be achieved.

Meanwhile, even in a situation where the rule for dot thinning in the colorant reducing process is not the same as the rule for arranging dots in the halftone process, an unintended pattern, such as moire, can be produced in some cases. Accordingly, a rule that specifies, as a pattern of dots to be discarded, a pattern in which dots are randomly and evenly distributed as in a blue noise pattern or a green noise pattern is desirably employed in the colorant reducing process.

Furthermore, as illustrated in FIG. 24, when a dot pattern, in which dots that are left after dot thinning in the colorant conversion process on the monochrome conversion route, and a dot pattern, in which dots that are left after dot thinning in the colorant conversion process on the full-color conversion route, overlap on each other, interference occurs, thereby reducing saturation as compared with an image where the dot patterns do not overlap on each other. In view of this, it is desirable to set the rule for dot thinning in the colorant conversion process on the monochrome conversion route and the rule for dot thinning in the colorant conversion process on the full-color conversion route such that positions of dots that are to be discarded in the colorant conversion process on the monochrome conversion route and positions of dots that are to be discarded in the colorant conversion process on the full-color conversion route do not overlap on each other, or, put another way, such that all or some of these dots do not overlap on each other. When such rules set in this way are applied, remaining dots that are not discarded in the colorant conversion process on the monochrome conversion route and remaining dots that are not discarded in the colorant conversion process on the full-color conversion route complement with each other as much as possible. Accordingly, a high-quality image free from interference can be provided with colorant usage reduced.

The image processing apparatus according to the fourth embodiment performs the dot thinning process, as the colorant reducing process, after the halftone processing. However, the order is not limited thereto, and the dot thinning process may be performed at any time of before the halftone processing, before the color conversion, and after the color conversion. The same goes for the dot-size reducing process serving as the colorant reducing process.

According to an aspect of the present invention, a high-quality image can be formed with colorant usage reduced by a large amount.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing method performed by an image processing apparatus that performs image processing to form an image on a printing medium by using colorants of a plurality of colors including black, the image processing method comprising:

performing, by a first color conversion unit, first color conversion on first image data to output second image data, the first image data representing tone values of each of colors in a color system that differ from a color system of the plurality of colors for each of pixels that form the image, the second image data representing tone values of a black separation on a per-pixel basis;

performing, by a second color conversion unit, second color conversion on the first image data to output third image data representing tone values of each of separations of the colors including black on a per-pixel basis;

performing, by a first colorant reducing unit, a first colorant reducing process that reduces amounts of colorant to be consumed of black on the second image data to output fourth image data representing tone values of the black separation on a per-pixel basis;

performing, by a second colorant reducing unit, a second colorant reducing process that reduces amounts of the colorants to be consumed of the colors other than black on a portion of the third image data, the portion corresponding to the separations of the colors other than black, to output fifth image data representing tone values of each of the separations of the colors other than black on a per-pixel basis; and combining, by a combining unit, the fourth image data and the fifth image data to output sixth image data representing tone values of each of the separations of the colors including black on a per-pixel basis.

2. The image processing method according to claim 1, wherein the first colorant reducing process is performed by multiplying at least one of the tone values represented by the second image data by a first coefficient, the first coefficient being equal to or greater than zero and less than or equal to one, to output the fourth image data representing the tone values of the black separation, in which the at least one of the tone values is multiplied by the first coefficient, on a per-pixel basis, and the second colorant reducing process is performed by multiplying at least one of the tone values represented by the portion of the third image data, the portion corresponding to the separations of the colors other than black, by a second coefficient, the second coefficient being equal to or greater than zero and less than or equal to one to output the fifth image data representing the tone values of the separations of the colors other than black, in which the at least one of the tone values is multiplied by the second coefficient, on a per-pixel basis.

3. The image processing method according to claim 2, wherein
the first colorant reducing process is performed by multiplying the at least one of the tone values represented by the second image data by the first coefficient to output the fourth image data, and
the second colorant reducing process is performed by multiplying the at least one of the tone values represented by the portion of the third image data, the portion corresponding to the separations of the colors other than black, by the second coefficient, the second coefficient being less than or equal to the first coefficient, to output the fifth image data.

4. The image processing method according to claim 2, wherein
the first coefficient includes one or more first coefficients that are in a one-to-one correspondence with the at least one of the tone values represented by the second image data,
the second coefficient includes one or more second coefficients that are in a one-to-one correspondence with the at least one of the tone values represented by the third image data,
the first colorant reducing process is performed by multiplying each of the at least one of tone values by a corresponding one of the first coefficients to output the fourth image data, and
the second colorant reducing process is performed by multiplying each of the at least one of the tone values represented by the portion of the third image data, the portion corresponding to the separations of the colors other than black, by a corresponding one of the second coefficients to output the fifth image data.

5. The image processing method according to claim 4, wherein
the first colorant reducing process is performed by multiplying each of the at least one of the tone values represented by the second image data by a corresponding one of the first coefficients to output the fourth image data, and
the second colorant reducing process is performed by multiplying each of the at least one of the tone values represented by the portion of the third image data, the portion corresponding to the separations of the colors other than black, by a corresponding one of the second coefficients, the corresponding one of the coefficients being less than or equal to the corresponding one of the first coefficients, to output the fifth image data.

6. The image processing method according to claim 2, wherein
the first colorant reducing process is performed by multiplying, of the tone values represented by the second image data, tone values of pixels that form a highlight of the image by a third coefficient that is greater than one, to output the fourth image data, and
the second colorant reducing process is performed by multiplying, of the tone values represented by the portion of the third image data, the portion corresponding to the separations of the colors other than black, tone values of the pixels that form the highlight of the image by a fourth coefficient that is greater than one to output the fifth image data.

7. The image processing method according to claim 1, wherein
the first colorant reducing process is performed by using a first or higher order polynomial, in which at least one of the tone values represented by the second image data are assigned to variables, to output the fourth image data, and
the second colorant reducing process is performed by using a first or higher order polynomial, in which at least one of the tone values represented by the portion corresponding to the separations of the colors other than black of the third image data are assigned to variables, to output the fifth image data.

8. The image processing method according to claim 1, further comprising:
performing, by a halftone processing unit, halftone processing that generates dot pattern data representing a dot pattern, in which dots are arranged, for each of the separations of the colors including black by using the sixth image data output at the combining; and
forming, by an image forming unit, an image on the printing medium by using the dot pattern data generated at the halftone processing.

9. The image processing method according to claim 1, further comprising switching, performed by a switching unit, at least any one of a method for performing the first colorant reducing process at the first colorant reduction and a method for performing the second colorant reducing process at the second colorant reduction according to an object contained in the image.

10. An image processing method performed by an image processing apparatus that performs image processing to form an image on a printing medium by using colorants of a plurality of colors including black, the image processing method comprising:
performing, by a first color conversion unit, first color conversion on first image data to output second image data, the first image data representing tone values of each of colors in a color system that differ from a color system of the plurality of colors for each of pixels that form the image, the second image data representing tone values of a black separation on a per-pixel basis;
performing, by a second color conversion unit, second color conversion on the first image data to output third image data representing tone values of each of separations corresponding to the colors including black on a per-pixel basis;
combining, by a combining unit, the second image data and a portion of the third image data, the portion corresponding to the separations of the colors other than black, to output fourth image data representing tone values of each of the separations of the colors including black on a per-pixel basis;
performing, by a halftone processing unit, halftone processing that generates dot pattern data representing a dot pattern, in which dots are arranged, for each of the separations of the colors including black by using the fourth image data output at the combining;
performing, by a first colorant reducing unit, a first colorant reducing process that reduces amounts of colorant to be consumed of black on a portion of the dot pattern data generated at the halftone processing, the portion corresponding to the black separation, to output first dot pattern data for the black separation; and performing, by a second colorant reducing unit, a second colorant reducing process that reduces amounts of the colorants to be consumed of the colors other than black on a portion of the dot pattern data, the portion corresponding to the separations of the colors other than black, to output second dot pattern data for each of the separations of the colors other than black.

11. The image processing method according to claim 10, wherein the first colorant reducing process is performed by performing at least any one of dot thinning and dot size reduction of the dots arranged in a dot pattern represented by the portion of the dot pattern data, the portion corresponding to the black separation, to generate the first dot pattern data, and the second colorant reducing process is performed by performing, for each of the separations of the colors other than black, at least any one of dot thinning and dot size reduction of the dots arranged in a dot pattern represented by the portion of the dot pattern data output at the halftone processing, the portion corresponding to the separations of the colors other than black, to generate the second dot pattern data.

12. The image processing method according to claim 10, wherein at the performing the first color reducing process, the first dot pattern data is generated by performing the first colorant reducing process on the portion of the dot pattern data output at the halftone processing, the portion corresponding to the black separation, in a manner as to avoid at least partial overlapping between dots arranged in the dot pattern represented by the first dot pattern data and dots arranged in a dot pattern represented by the second dot pattern data; and at the performing the second colorant reducing process, the second dot pattern data is generated by performing the second colorant reducing process on the portion of the dot pattern data output at the halftone processing, the portion corresponding to the separations of the colors other than black, in a manner as to avoid at least partial overlapping between the dots arranged in the dot pattern represented by the first dot pattern data and the dots arranged in the dot pattern represented by the second dot pattern data.

13. The image processing method according to claim 10, further comprising forming, by a image forming unit, an image on a printing medium by using the first dot pattern data output at the first colorant reduction and the second dot pattern data output at the second colorant reduction.

14. An image processing apparatus that performs image processing to form an image on a printing medium by using colorants of a plurality of colors including black, the image processing apparatus comprising:

a first color conversion unit that performs first color conversion on first image data to output second image data, the first image data representing tone values of each of colors in a color system that differ from a color system of the plurality of colors for each of pixels that form the image, the second image data representing tone values of a black separation on a per-pixel basis;

a second color conversion unit that performs second color conversion on the first image data to output third image data representing tone values of each of the separations corresponding to the colors including black on a per-pixel basis;

a first colorant reducing unit that performs a first colorant reducing process that reduces amounts of colorant to be consumed of black on the second image data to output fourth image data representing tone values of the black separation on a per-pixel basis;

a second colorant reducing unit that performs a second colorant reducing process that reduces amounts of the colorants to be consumed of the colors other than black on a portion of the third image data, the portion corresponding to the separations of the colors other than black, to output fifth image data representing tone values of each of the separations of the colors other than black on a per-pixel basis; and a combining unit that combines the fourth image data and the fifth image data to output sixth image data representing tone values of each of the separations of the colors including black on a per-pixel basis.

15. A non-transitory computer-readable medium having computer-readable program codes recorded thereon that when executed cause a computer to perform the image processing method according to claim 1.

\* \* \* \* \*